(12) United States Patent
Gessler et al.

(10) Patent No.: US 11,467,609 B2
(45) Date of Patent: Oct. 11, 2022

(54) PRESSURE-REGULATING DEVICE, SYSTEMS INCLUDING THE PRESSURE-REGULATING DEVICE, AND RELATED METHODS

(71) Applicant: Mobile I.V. Systems, LLC, Chugiak, AK (US)

(72) Inventors: Ryan Gessler, Camas, WA (US); Fred Vreeman, Fairbanks, AK (US)

(73) Assignee: MOBILE I.V. SYSTEMS, LLC, Chugiak, AK (US)

( * ) Notice: Subject to any disclaimer, the term of this patent is extended or adjusted under 35 U.S.C. 154(b) by 0 days.

(21) Appl. No.: 16/995,723

(22) Filed: Aug. 17, 2020

(65) Prior Publication Data

US 2020/0379490 A1  Dec. 3, 2020

Related U.S. Application Data

(63) Continuation of application No. 16/093,552, filed as application No. PCT/US2017/027217 on Apr. 12, 2017, now Pat. No. 10,747,241.

(60) Provisional application No. 62/321,667, filed on Apr. 12, 2016.

(51) Int. Cl.
 *F16K 31/12* (2006.01)
 *G05D 16/10* (2006.01)
 *G05D 16/04* (2006.01)

(52) U.S. Cl.
 CPC ....... *G05D 16/107* (2019.01); *G05D 16/0402* (2019.01); *G05D 16/103* (2013.01); *Y10T 137/7795* (2015.04); *Y10T 137/7808* (2015.04)

(58) Field of Classification Search
 CPC ......... Y10T 137/7795; Y10T 137/7808; Y10T 137/7825; Y10T 137/7826
 See application file for complete search history.

(56) References Cited

U.S. PATENT DOCUMENTS

| | | | | |
|---|---|---|---|---|
| 1,465,654 A | * | 8/1923 | Radtke | F25B 41/31 137/454.2 |
| 1,561,367 A | * | 11/1925 | Spreen | F16K 29/00 137/454.5 |
| 1,703,531 A | * | 2/1929 | Hyde | F25B 41/31 137/505.42 |

(Continued)

FOREIGN PATENT DOCUMENTS

| CA | 2256776 A1 | 7/2000 |
|---|---|---|
| CA | 2256776 A1 ‡ | 7/2000 |

(Continued)

OTHER PUBLICATIONS

International Search Report and Written Opinion dated Aug. 16, 2017 for PCT application No. PCT/US2017/027217.‡

(Continued)

*Primary Examiner* — Robert K Arundale
(74) *Attorney, Agent, or Firm* — Dorsey & Whitney LLP

(57) ABSTRACT

Embodiments described herein relate to a pressure-regulating device, systems that include the device, and related methods. For example, the pressure-regulating device may receive gas from a gas supply at a first pressure (e.g., on a supply side of the pressure-regulating device) and may regulate or reduce the pressure of the received gas to a selected or suitable second, different pressure.

15 Claims, 24 Drawing Sheets

(56) References Cited

U.S. PATENT DOCUMENTS

| | | | | |
|---|---|---|---|---|
| 2,057,150 A ‡ | 10/1936 | Kehl | ............... | G05D 16/0402 137/505.12 |
| 2,160,025 A * | 5/1939 | Erle | ............... | B64C 11/42 416/139 |
| 2,313,149 A ‡ | 3/1943 | Jacobsson | ............... | A62B 9/022 137/81.1 |
| 2,343,146 A * | 2/1944 | Jenkins | ............... | G05D 16/0663 137/316 |
| 2,618,908 A ‡ | 11/1952 | Salter | ............... | G05D 16/10 137/454.5 |
| 2,666,278 A * | 1/1954 | Matasovic | ............... | G05D 16/0663 137/454.5 |
| 2,770,252 A ‡ | 11/1956 | Bass, Sr. | ............... | G05D 16/0402 137/505.12 |
| 3,153,424 A * | 10/1964 | Acker | ............... | G05D 16/0663 137/505.41 |
| 3,407,841 A * | 10/1968 | Semon | ............... | G05D 16/0658 137/505.15 |
| 3,825,008 A ‡ | 7/1974 | Shook | ............... | A61B 17/135 606/202 |
| 3,890,999 A * | 6/1975 | Moskow | ............... | G05D 16/103 137/505.25 |
| 4,446,859 A ‡ | 5/1984 | Pedersen | ............... | A62B 9/022 128/20 |
| 4,450,858 A * | 5/1984 | Acomb | ............... | G05D 16/0663 137/484.8 |
| 4,657,160 A ‡ | 4/1987 | Woods | ............... | A61M 5/1483 |
| 4,862,884 A ‡ | 9/1989 | Christianson | ............... | B63C 11/18 128/20 |
| 5,307,834 A ‡ | 5/1994 | Tatarek-Gintowt | .... | G05D 16/10 137/11 |
| 5,346,477 A ‡ | 9/1994 | Edwards | ............... | A61M 5/1483 604/11 |
| 5,749,854 A ‡ | 5/1998 | Shen | ............... | A61M 5/1486 604/11 |
| 5,894,869 A ‡ | 4/1999 | Mussack | ............... | B67D 1/0418 141/19 |
| 5,911,220 A ‡ | 6/1999 | Morgan | ............... | A62B 9/02 128/20 |
| 5,921,275 A * | 7/1999 | Knop | ............... | F16K 31/404 137/498 |
| 6,026,849 A ‡ | 2/2000 | Thordarson | ............... | G05D 7/0106 137/50 |
| 6,488,046 B2 ‡ | 12/2002 | Parietti | ............... | G05D 16/0672 137/50 |
| 6,843,388 B1 ‡ | 1/2005 | Hollars | ............... | F17C 13/06 222/18 |
| 6,948,520 B2 ‡ | 9/2005 | Carroll | ............... | G05D 16/103 137/50 |
| 7,080,655 B2 ‡ | 7/2006 | Jacksier | ............... | G05D 16/103 137/14 |
| 7,140,387 B2 ‡ | 11/2006 | Wilson, Jr. | ............... | F41A 33/06 137/50 |
| 7,290,563 B2 ‡ | 11/2007 | Nakamura | ............... | F16K 7/075 137/61 |
| 7,334,598 B1 ‡ | 2/2008 | Hollars | ............... | F17C 13/04 137/11 |
| 7,635,005 B2 ‡ | 12/2009 | Blankevoort | ............... | G01N 30/32 137/50 |
| 7,757,710 B2 ‡ | 7/2010 | Larsen | ............... | G05D 16/103 137/50 |
| 8,087,428 B1 ‡ | 1/2012 | Beswick | ............... | F16K 17/085 137/50 |
| 8,167,001 B2 ‡ | 5/2012 | Larsen | ............... | G05D 16/0404 137/88 |
| 8,327,871 B1 ‡ | 12/2012 | Franklin | ............... | G05D 16/0655 137/27 |
| 8,375,983 B2 ‡ | 2/2013 | Niebel | ............... | G05D 16/0402 137/50 |
| 9,310,812 B2 ‡ | 4/2016 | Costle | ............... | G05D 16/103 |
| 9,739,388 B2 ‡ | 8/2017 | Rider | ............... | B67D 1/0412 |
| 10,126,758 B2 ‡ | 11/2018 | Ottestad | ............... | G05D 16/10 |
| 10,747,241 B2 | 8/2020 | Gessler et al. | | |
| 2003/0164190 A1* | 9/2003 | Ellero | ............... | G05D 16/0663 137/505.42 |
| 2004/0173267 A1 | 9/2004 | Jacksier et al. | | |
| 2004/0187929 A1‡ | 9/2004 | Carroll | ............... | G05D 16/103 137/50 |
| 2004/0231733 A1‡ | 11/2004 | Nakamura | ......... | G05D 16/0404 137/61 |
| 2004/0256008 A1* | 12/2004 | Huang | ............... | G05D 16/103 137/505.25 |
| 2005/0152796 A1* | 7/2005 | Morrison | ............... | G05D 16/103 417/440 |
| 2006/0157122 A1‡ | 7/2006 | Kawamura | ......... | G05D 16/103 137/613 |
| 2006/0185736 A1‡ | 8/2006 | Cavagna | ............... | G05D 16/0683 137/50 |
| 2007/0017524 A1‡ | 1/2007 | Wilson | ............... | A61M 16/207 128/20 |
| 2007/0272313 A1‡ | 11/2007 | Olds | ............... | G05D 16/0663 137/61 |
| 2008/0011361 A1‡ | 1/2008 | Larsen | ............... | G05D 16/103 137/52 |
| 2009/0020169 A1* | 1/2009 | Lo | ............... | G05D 16/103 137/484.2 |
| 2009/0071548 A1‡ | 3/2009 | Patterson | ............... | G05D 16/103 137/49 |
| 2009/0071550 A1‡ | 3/2009 | Patterson | ............... | G05D 16/103 137/52 |
| 2010/0206401 A1‡ | 8/2010 | Niebel | ............... | G05D 16/185 137/505.11 |
| 2011/0155267 A1‡ | 6/2011 | Nicolini | ............... | F17C 13/04 137/511 |
| 2012/0181287 A1* | 7/2012 | Holbeche | ............... | F16K 17/16 220/582 |
| 2012/0234407 A1‡ | 9/2012 | Edwards | ............ | G05D 16/0655 137/505 |
| 2014/0102560 A1* | 4/2014 | Costle | ............... | G05D 16/0402 137/505.12 |
| 2017/0123439 A1‡ | 5/2017 | Koenig | ............... | G05D 16/0402 |
| 2019/0070362 A1‡ | 3/2019 | Lynch | ............... | A61M 5/19 |
| 2019/0179348 A1 | 6/2019 | Gessler et al. | | |

FOREIGN PATENT DOCUMENTS

| | | | | |
|---|---|---|---|---|
| CN | 1573188 A | 2/2005 | | |
| CN | 1720491 A | 1/2006 | | |
| CN | 1985122 A | 6/2007 | | |
| CN | 201218424 Y | 4/2009 | | |
| CN | 201218424 Y ‡ | 4/2009 | | |
| CN | 101966975 A | 2/2011 | | |
| CN | 102758943 A | 10/2012 | | |
| CN | 102758943 A ‡ | 10/2012 | | |
| CN | 202545919 U | 11/2012 | | |
| CN | 202545919 U ‡ | 11/2012 | | |
| DE | 19821292 A1 | 11/1999 | | |
| DE | 19821292 A1 ‡ | 11/1999 | | |
| DE | 102017113055 A1 | 12/2018 | | |
| DE | 102017113055 A1 ‡ | 12/2018 | | |
| EP | 2275037 A1 ‡ | 1/2011 | | |
| EP | 2275037 A1 | 1/2011 | | |
| EP | 2191178 B1 ‡ | 11/2012 | ......... | G05D 16/0402 |
| EP | 2191178 B1 | 11/2012 | | |
| EP | 2720105 A2 | 4/2014 | | |
| JP | 2004360893 A | 12/2004 | | |
| KR | 20090116689 A | 11/2009 | | |
| KR | 101244377 B1 ‡ | 3/2013 | | |
| KR | 101244377 B1 | 3/2013 | | |
| RU | 152440 U1 ‡ | 5/2015 | | |
| RU | 152440 U1 | 5/2015 | | |
| WO | 2017180750 A1 | 10/2017 | | |
| WO | WO-2017180750 A1 ‡ | 10/2017 | | |
| WO | 2018041820 A1 | 3/2018 | | |
| WO | WO-2018041820 A1 ‡ | 3/2018 | | |

OTHER PUBLICATIONS

(56) References Cited

OTHER PUBLICATIONS

English translation of Office Action for IN Application No. 201817042374, dated Jan. 18, 2021.
English translation of Office Action for JP Application No. 2019-505128, dated Feb. 8, 2021.
English translation of Office Action for KR Appiication No. 10-2018-7032761, dated Jan. 28, 2021.
First office action received in CN App. No. 201780036611.3 dated Jun. 1, 2020.
Extended European Search Report for Application No. 17783060.1, dated Feb. 19, 2020.
Partial Supplementary European Search Report for Application No. 17783060.1, dated Nov. 5, 2019.

\* cited by examiner
‡ imported from a related application

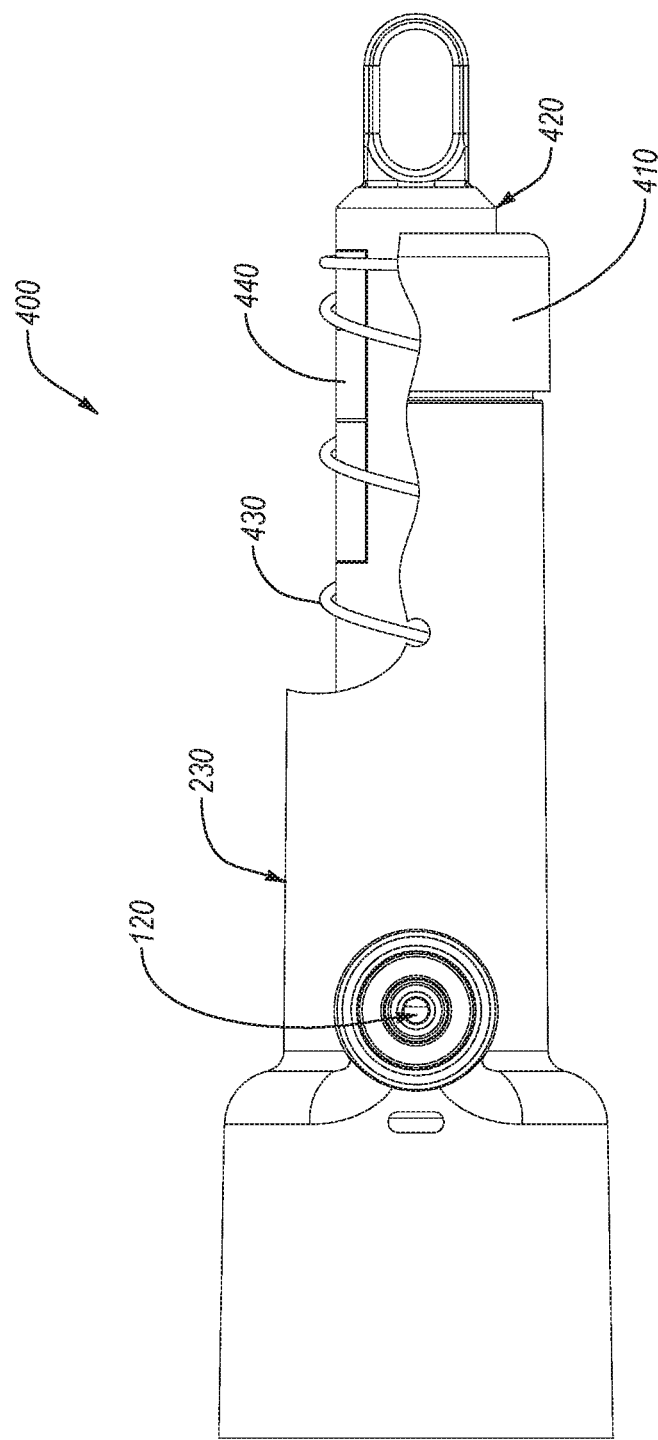

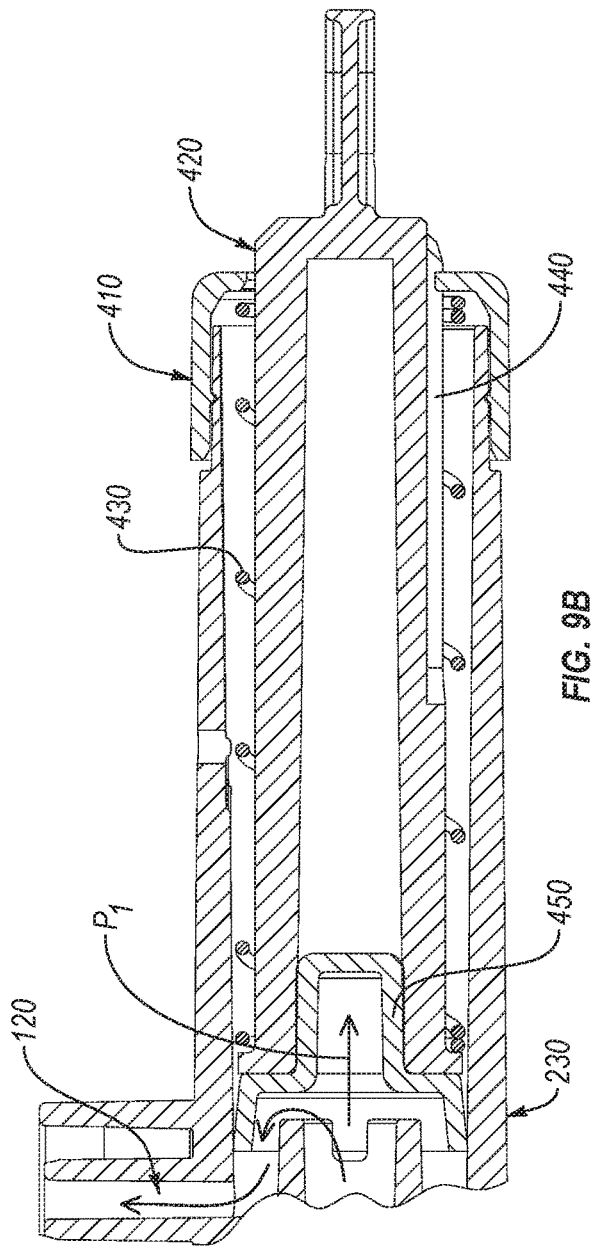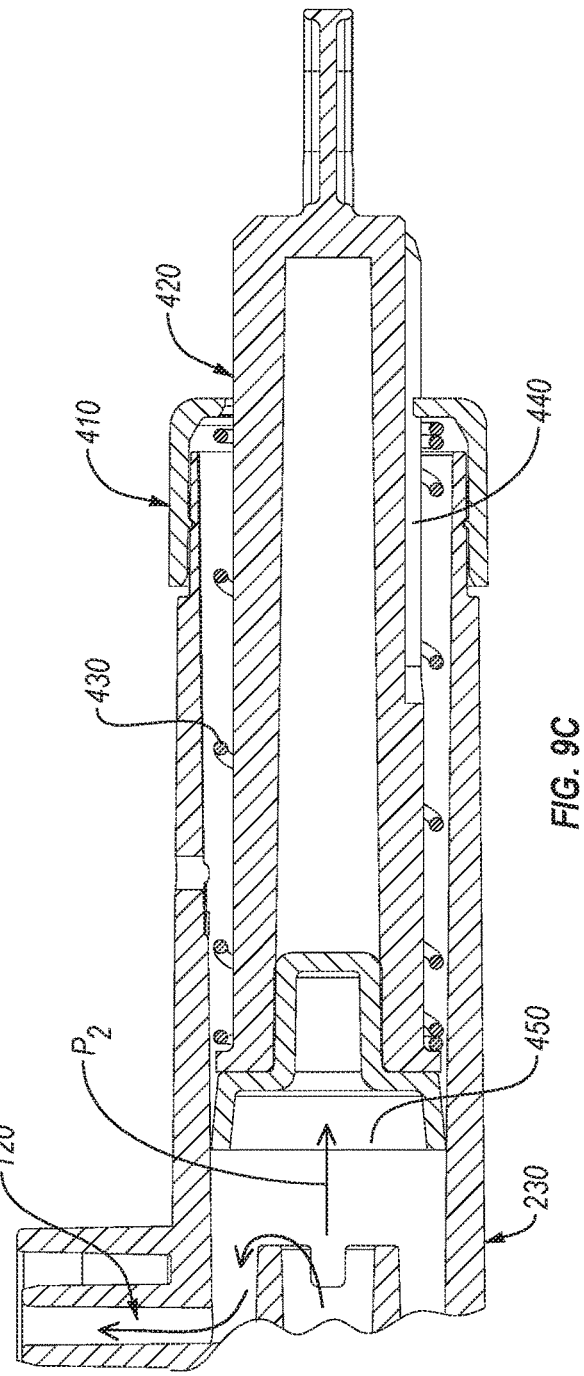

PRESSURE-REGULATING DEVICE, SYSTEMS INCLUDING THE PRESSURE-REGULATING DEVICE, AND RELATED METHODS

CROSS-REFERENCE TO RELATED APPLICATIONS

This application is a continuation of U.S. patent application Ser. No. 16/093,552 filed on Oct. 12, 2018, and issued as U.S. Pat. No. 10,747,241 on Aug. 18, 2020, which is a U.S. National Stage filing under 35 U.S.C. § 371 of PCT Application No. PCT/US2017/027217, filed on Apr. 12, 2017, which claims the benefit of priority to U.S. Provisional Application No. 62/321,667 filed on Apr. 12, 2016, the contents of which are incorporated herein by this reference.

BACKGROUND

Commonly, compressing gas facilitates storage and transportation thereof. For example, compressed gas may require smaller storage containers (e.g., compared to uncompressed gas), which may enhance convenience of storage, transportation, or use of the gas. Moreover, compressed gas may be used as propellant or pneumatic power supply. For example, one or more mechanisms may be pneumatically powered by the expansion and/or application of pressure of the compressed gas.

In some circumstances, the gas may be stored at pressures that exceed the pressure required during one or more applications thereof. A pressure regulation device may be used to reduce the pressure of the source gas to a suitable or selected pressure for one or more devices that receive the source gas.

SUMMARY

Generally, the embodiments described herein relate to a pressure-regulating device, systems that include the device, and related methods. For example, the pressure-regulating device may receive gas from a gas supply at a first pressure (e.g., on a supply side of the pressure-regulating device) and may regulate or reduce the pressure of the received gas to a selected or suitable second, different pressure. In an embodiment, the gas at the second pressure may exit from gas outlet of the pressure-regulating device.

An embodiment includes a pressure-regulating device that includes a gas inlet, an expansion body defining an expansion chamber that is in fluid communication with the gas inlet, a first stage pressure regulator configured to decrease gas pressure of a gas flowing therethrough, the first stage pressure regulator being in fluid communication with the expansion chamber, an intermediate regulator body threadedly connected to the expansion body and securing at least a portion of the first stage pressure regulator therebetween in a manner that changing distance between the expansion body and the intermediate regulator body changes an amount of pressure decrease produced by the first stage regulator, a second stage pressure regulator positioned downstream from first stage pressure regulator and in fluid communication therewith, the second stage pressure regulator being configured to decrease gas pressure of a gas flowing therethrough, and a gas outlet positioned downstream from the second stage pressure regulator.

Embodiments also include a pressure-regulating device that includes a gas inlet, an expansion body defining an expansion chamber that is in fluid communication with the gas inlet, and a first stage pressure regulator configured to decrease gas pressure of a gas flowing therethrough, the first stage pressure regulator being in fluid communication with the expansion chamber. The first stage pressure regulator includes a first valve including a first sealing member configured to open and close gas flow through the first valve, a first piston movable in an upstream and downstream directions relative to the gas inlet and configured to move the sealing member in the manner that opens the first valve, a first biasing member positioned to apply a force the first piston in the upstream direction, and a first adjustment mechanism including opposing first and second threaded protrusions, threadedly engauged together and enclosing the first valve and the first biasing member therebetween. The pressure-regulating device also includes a second stage pressure regulator positioned downstream from first stage pressure regulator and in fluid communication therewith. The second stage pressure regulator is configured to decrease gas pressure of a gas flowing therethrough. The pressure-regulating device further includes a gas outlet positioned downstream from the second stage pressure regulator.

An embodiment includes a system that includes a pressure cuff and a pressure-regulating device. The pressure-regulating device includes a gas inlet, an expansion body defining an expansion chamber that is in fluid communication with the gas inlet, a first stage pressure regulator configured to decrease gas pressure of a gas flowing therethrough, the first stage pressure regulator being in fluid communication with the expansion chamber, an intermediate regulator body threadedly connected to the expansion body and securing at least a portion of the first stage pressure regulator therebetween in a manner that changing distance between the expansion body and the intermediate regulator body changes an amount of pressure decrease produced by the first stage regulator, a second stage pressure regulator positioned downstream from first stage pressure regulator and in fluid communication therewith, the second stage pressure regulator being configured to decrease gas pressure of a gas flowing therethrough, and a gas outlet positioned downstream from the second stage pressure regulator and operably connected to the pressure cuff.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

For better understanding, the like elements are referenced by like reference numbers. The drawings are not necessarily to scale, with the emphasis instead placed upon the principles of the present disclosure. Understanding that these drawings depict only typical embodiments of the invention and are not therefore to be considered to be limiting of its scope, the invention will be described and explained with additional specificity and detail through the use of the accompanying drawings in which:

FIG. 9A is a side view of a pressure gauge of a pressure-regulating device according to an embodiment;

FIG. 9B is a cross-sectional view of the pressure gauge of FIG. 9A exposed to a first pressure;

FIG. 9C is a cross-sectional view of the pressure gauge of FIG. 9A exposed to a second pressure;

DETAILED DESCRIPTION

Generally, the embodiments described herein relate to a pressure-regulating device, systems that include the device, and related methods. For example, the pressure-regulating device may receive gas from a gas supply at a first pressure (e.g., on a supply side of the pressure-regulating device) and may regulate or reduce the pressure of the received gas to a selected or suitable second, different pressure. In an embodiment, the gas at the second pressure may exit from gas outlet of the pressure-regulating device.

In some embodiments, the outlet pressure of pressure-regulating device may be adjusted or calibrated to a suitable pressure. For example, the pressure-regulating device may include and/or may be connected to a pressure gauge that may provide an indication of the gas outlet pressure. Moreover, the pressure-regulating device may include one or more pressure-adjustment mechanisms. In some embodiments, the pressure-regulating device includes at least two pressure-adjustment mechanisms. The pressure-regulating device may include a first stage regulator that may be adjusted to reduce gas pressure from the supply pressure to a lower pressure that is within a selected pressure range, and may further include a second stage regulator that may further adjust the outlet pressure (e.g., decrease the gas pressure) to be an a narrower or more precise pressure range. For example, the first stage regulator may be used for coarse adjustment of the outlet pressure, and the second stage regulator may be used for finer or more precise pressure adjustment of the outlet pressure.

Figure 1A:
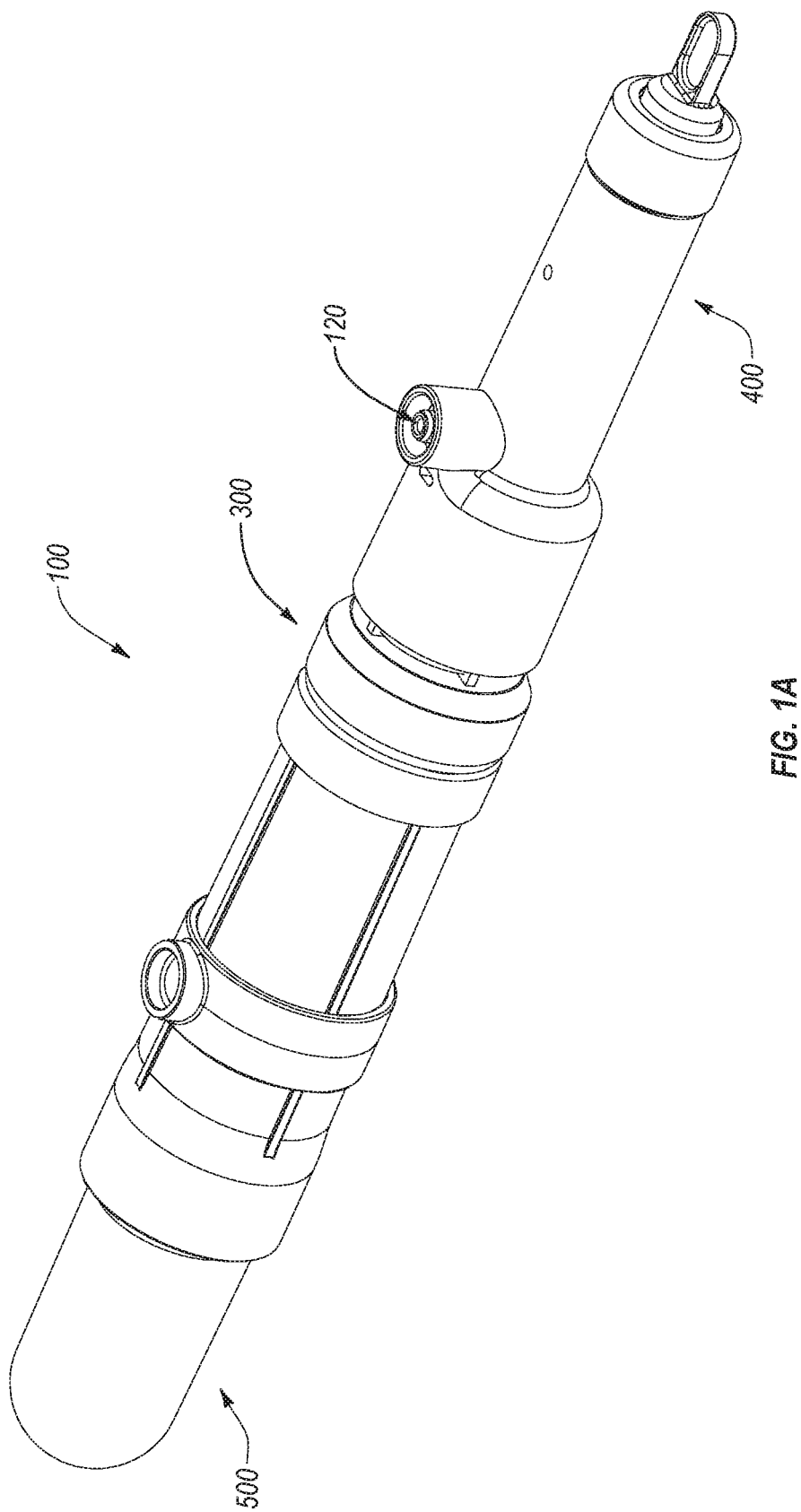
FIG. 1A is a perspective view of a pressure-regulating device according to an embodiment.
Figure 1B:
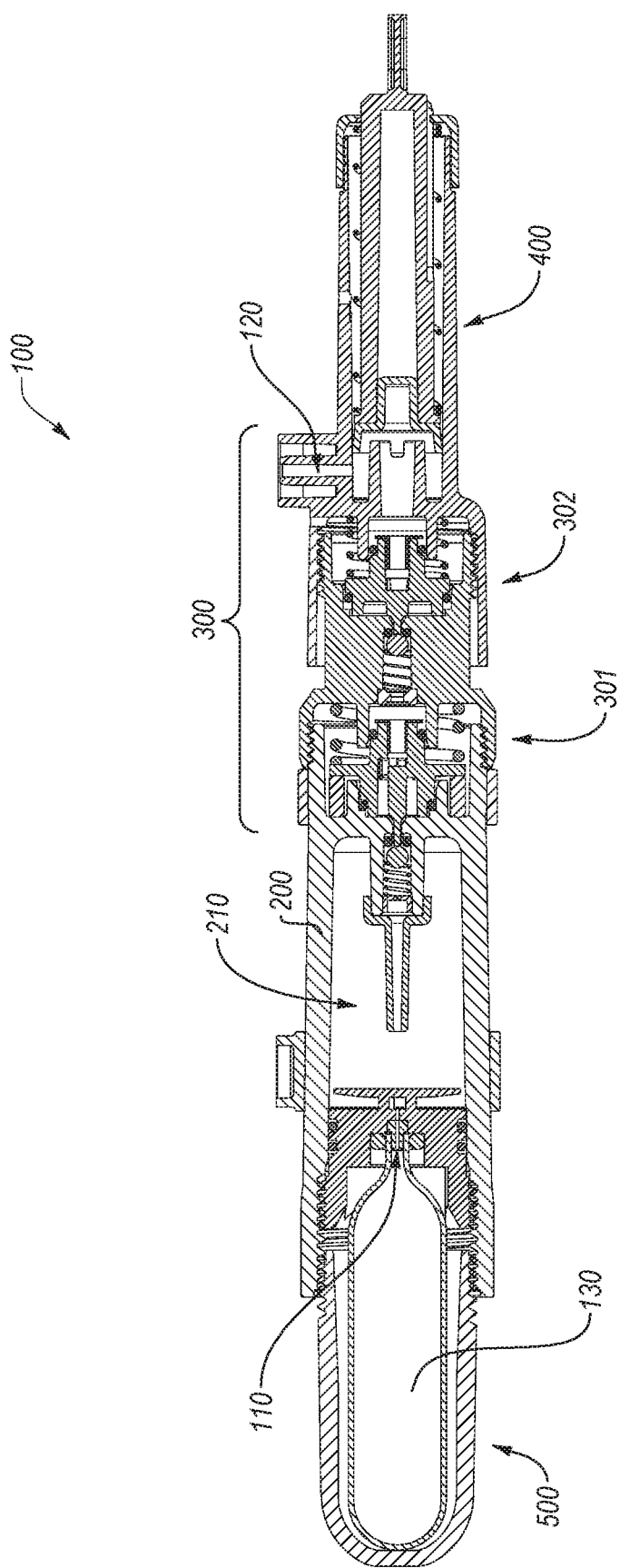
FIG. 1B is a cross-sectional view of the pressure-regulating device of FIG. 1A.

FIGS. 1A-1B illustrate a pressure-regulating device 100 according to an embodiment. Specifically, FIG. 1A is a perspective view of the pressure-regulating device 100; and FIG. 1B is a cross-sectional view of the pressure-regulating device 100. In the illustrated embodiment, the pressure-regulating device 100 includes a gas inlet 110 and a gas outlet gas outlet 120. As mentioned above, the pressure at the gas inlet 110 may be higher than at the gas outlet 120. Moreover, the pressure-regulating device 100 may be adjusted or calibrated to produce a suitable or selected pressure reduction from the gas inlet 110 to the gas outlet 120 and/or to produce a suitable or selected pressure at the gas outlet 120.

Generally, the pressure-regulating device 100 may receive gas from any number of suitable gas sources or supplies. In the illustrated embodiment, as described below in more detail, the pressure-regulating device 100 may be configured to accept a gas cartridge 130 that includes compressed gas (e.g., a standard $CO_2$ gas cartridge). In additional or alternative embodiments, the pressure-regulating device 100 may receive compressed gas from a centralized supply (e.g., a supply line) or any other suitable source. In any event, compressed gas from a suitable supply may flow into the gas inlet 110. For ease of description, the direction of the gas flow in the pressure-regulating device 100 is referred to as downstream or distal, and a direction that is opposite to the downstream direction is referred to as upstream or proximal.

Compressed gas, at first pressure, may enter the pressure-regulating device 100 at the gas inlet 110 and exit the pressure-regulating device 100 at the gas outlet 120, at a second, lower pressure. For example, the ratio of the first pressure to second pressure may be in one or more of the following ranges: from 2:1 to 5:1, from 4:1 to 10:1, from 8:1 to 20:1, from 15:1 to 50:1, from 40:1, to 100:1. For example, the pressure-regulating device 100 may reduce pressure from 800 psi to 10 psi or less (e.g., to 5 psi, 1 psi). Moreover, in some embodiments, the pressure-regulating device 100 may be configured to reduce or adjust pressure in a manner that produces the pressure ratio between the gas inlet 110 and gas outlet 120 that is outside the above-noted ranges. It should be appreciated that the pressure values expressed herein are described in terms of pressure above atmospheric pressure (e.g., a reference to the pressure of 5 psi refers to absolute pressure of about 19.7 psi).

In the illustrated embodiment, the pressure-regulating device 100 includes an expansion body 200 that may be operably connected to the gas inlet 110. For example, the expansion body 200 may have an expansion chamber 210 (e.g., defined by one or more walls of the expansion body 200) that may be in fluid communication with the gas inlet 110. Hence, for example, gas may flow from the gas inlet 110 into the expansion chamber 210. In some embodiments, as the gas enters the expansion chamber 210, the gas may expand in the expansion chamber 210 (e.g., the amount of the gas entering the expansion chamber 210 may have or occupy a greater volume than before entering the expansion chamber 210), such that the pressure of the gas in the expansion chamber 210 is lower than the pressure of the gas before entering the expansion chamber 210.

It should be appreciated, however, that in some embodiments, the expansion chamber 210 may be in continuous fluid communication with the gas inlet 110. Hence, for example, the pressure of the gas in the expansion chamber 210 may be the same as the pressure of the gas in the gas cartridge 130 or at the gas source that is otherwise connected to gas inlet 110. For example, expansion of the gas from the gas cartridge 130 into the expansion chamber 210 may reduce the pressure of the gas in the gas cartridge 130, such that the gas in the expansion chamber 210 and in the gas cartridge 130 is at a lower pressure than the pressure of the gas that was in the gas cartridge 130, before entry into the expansion chamber 210.

In an embodiment, the pressure-regulating device 100 includes a pressure regulator 300 that is in fluid communication with the gas inlet 110 and gas outlet 120. Specifically, for example, the pressure regulator 300 may reduce and/or regulate the pressure of the gas to produce a suitable or selected pressure at the gas outlet 120. In the illustrated embodiment, the pressure regulator 300 is a two-stage pressure regulator. For example, at a first stage regulator 301, the pressure regulator 300 may be adjusted or calibrated to produce a selected pressure output to the gas outlet 120 at a first degree of accuracy or precision, and at a subsequent, second stage regulator 302, the pressure regulator 300 may be adjusted or calibrated to produce a selected pressure output at a second, higher degree of accuracy or precision (e.g., the first and second stage regulators 301, 302 may facilitate fine-tuning or calibration of the pressure regulator 300 to a selected or suitable degree of precision). The second stage regulator 302 may be positioned downstream from the first stage regulator 301 and in fluid communication therewith. Moreover, it should be appreciated that the pressure-regulating device may include any suitable number of stages.

As mentioned above, the pressure-regulating device 100 may be operably coupled to or may include a gauge or a pressure indicator that may be configured to determine and/or provide a measurement or indication of the gas pressure at the gas outlet 120. In the illustrated embodiment, the pressure-regulating device 100 includes a pressure gauge 400. For example, the pressure gauge 400 may be operably connected to the pressure regulator 300 (e.g., the pressure gauge 400 may be in fluid communication with the pressure regulator 300 and/or with the gas outlet 120 of the pressure-regulating device 100). Under some operating conditions, the pressure gauge 400 may facilitate or assist with calibration of the pressure regulator 300. For example, the pressure regulator 300 may be calibrated to produce a suitable or selected pressure at the gas outlet 120 based on the pressure readings at the pressure gauge 400.

Generally, the pressure gauge 400 may have any number of suitable configurations (e.g., the pressure gauge 400 may be mechanical and/or analogue gauge or may be a digital gauge). In the illustrated embodiment, the pressure gauge 400 includes an indicator piston that may move out of a regulator cap in response to a pressure experienced by the indicator piston. The indicator piston may include one or more markings that correspond to a pressure required to move the indicator piston out of the regulator cap to expose the marking. That is, as the indicator piston moves out of the regulator cap (due to the pressure experienced by the indicator piston), the markings corresponding to the pressure experience by the indicator piston are exposed and/or may align with a stationary indicator to provide a reading or indication of the pressure. In any event, a pressure gauge that may be connected to or incorporated into the pressure-regulating device 100 may provide a pressure reading that indicates the gas pressure at the gas outlet 120 of the pressure-regulating device 100.

Figure 2A:
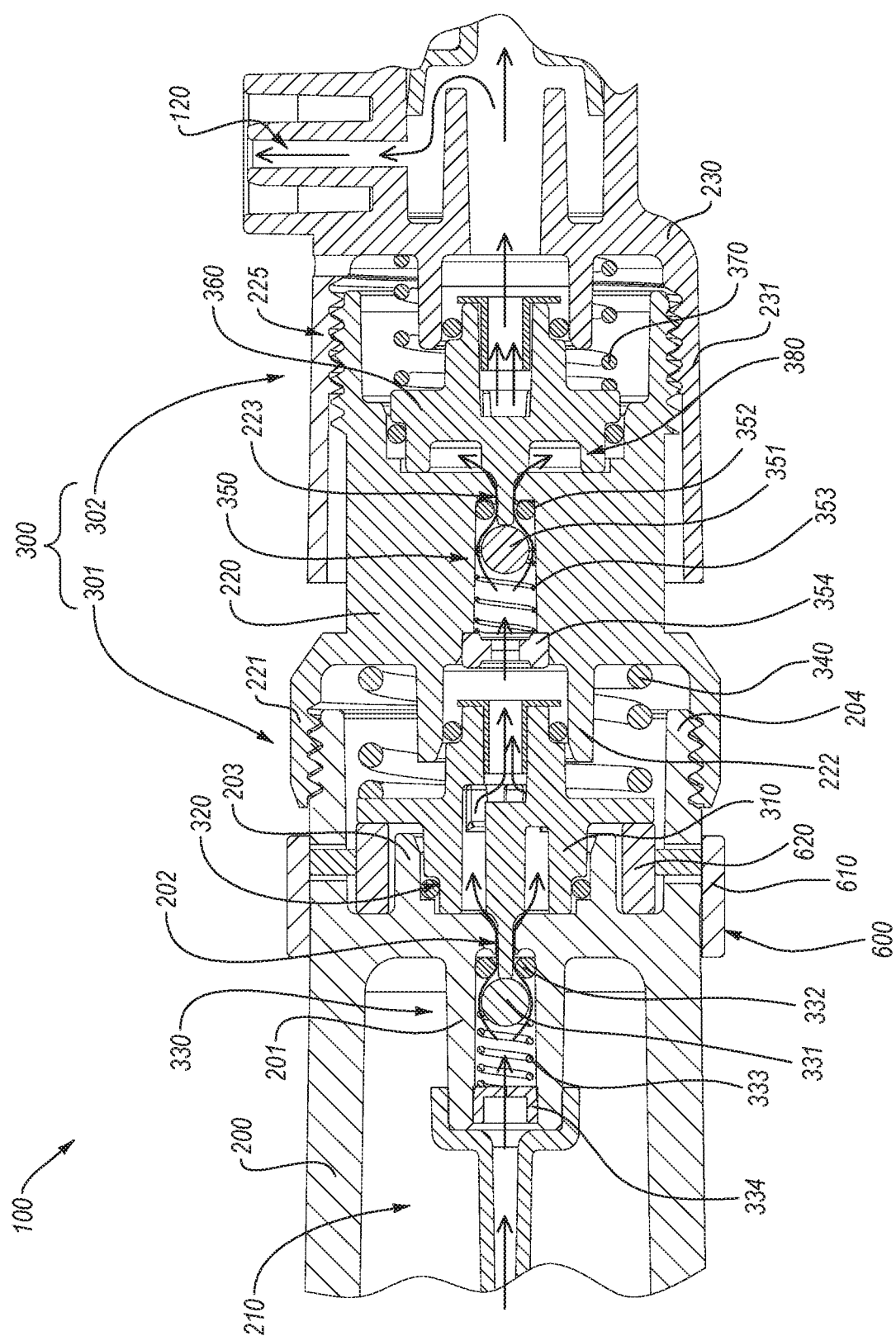
FIG. 2A is an enlarged, partial cross-sectional view of the pressure-regulating device of FIG. 1A in an open configuration.
Figure 2B:
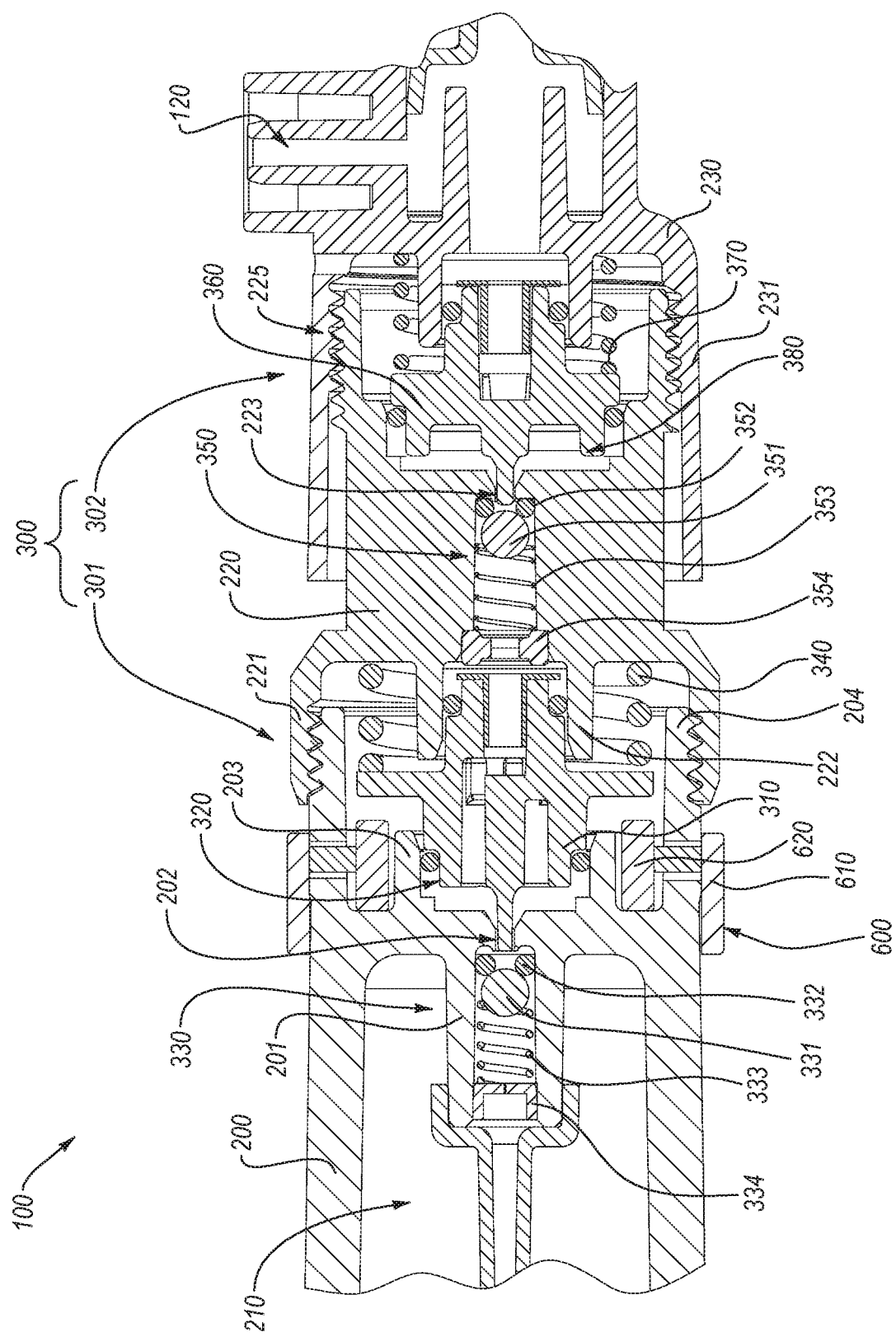
FIG. 2B is an enlarged, partial cross-sectional view of the pressure-regulating device of FIG. 1A in a closed configuration

As mentioned above, the pressure regulator 300 may control the gas pressure at the gas outlet 120. FIGS. 2A-2B are partial, cross-sectional views of the pressure-regulating device 100 (FIGS. 1A-1B), showing the pressure regulator 300 of the pressure-regulating device 100. Specifically, in FIG. 2A, the pressure regulator 300 is shown in an open configuration, and in FIG. 2B, the pressure regulator 300 is shown in a closed configuration, during its operation. As described below in more detail, continuously reconfiguring the pressure regulator 300 between open and closed configurations may control the output pressure or produce the selected pressure at the gas outlet 120.

For example, the gas outlet 120 may be operably connected to a device (e.g., as described below, the gas outlet 120 may be connected to a pressure cuff). Under some operating conditions, the pressure-regulating device 100 and a device connected thereto may define or form a closed system or semi-closed system, where the gas outlet 120 may be in fluid communication with an inlet of the device connected to the pressure-regulating device 100 and/or with a chamber of the connected device, such that the pressure at the gas outlet 120 may be generally or approximately the same as the pressure in the connected device.

Under some operating conditions, the pressure at the gas outlet 120 may be approximately 0 psi (e.g., the pressure at the gas outlet 120 and/or in the device connected to the pressure-regulating device 100 may be approximately atmospheric pressure). In some embodiments, when the gas outlet 120 is below a selected pressure (e.g., a cut-off pressure for which the pressure regulator 300 is calibrated), the pressure regulator 300 may be in the open configuration (shown in FIG. 2A), such that the gas can flow to the gas outlet 120, to increase the pressure at the gas outlet 120 to the selected pressure, at which the pressure regulator 300 may assume the closed configuration, to prevent further gas flow to the gas outlet 120 (as described below). Moreover, as the pressure at the gas outlet 120 drops below the selected pressure, the pressure regulator 300 may again assume the open configuration to allow more gas to pass to the gas outlet 120, thereby increasing the pressure at the gas outlet 120 to the selected pressure, and again, at which the pressure regulator 300 may assume the closed configuration. As such, the pressure regulator 300 may cycle between open and closed configurations to selectively and/or intermittently permit gas to flow to the gas outlet 120 (e.g., from the gas inlet 110), to maintain a selected pressure at the gas outlet 120 and/or in the device connected to the gas outlet 120.

For example, the first stage regulator 301 of the pressure regulator 300 may include a first piston 310 that is movable in a proximal direction (e.g., toward the gas inlet) open the first stage regulator 301 of the pressure regulator 300 and allow the gas to flow through the first stage regulator 301 (e.g., as indicated with the arrows in FIG. 2A). The first piston 310 also may move distally to close or prevent gas flow through the first stage regulator 301. For example, the first stage regulator 301 may include a chamber 320 (described below in more detail). When the pressure in the chamber 320 is below a selected pressure (e.g., below the output pressure at the gas outlet 120), the first piston 310 moves in the proximal direction, which allows pressurized gas to enter the chamber 320 and move the first piston 310 in the distal direction (e.g., when the pressure in the chamber 320 is at the selected pressure) and stop further entry of gas into the chamber 320, thereby closing or preventing gas flow through the first stage regulator 301.

In the illustrated embodiment, the first stage regulator 301 includes a first valve 330 that may be operated by the first piston 310 to open and close gas flow through the first stage regulator 301. For example, the first valve 330 may have a sealing member 331, a seal 332 (e.g., an O-ring), and a spring 333 that may press or bias the sealing member 331 toward and into engagement with the seal 332. Specifically, when the sealing member 331 is pressed against the seal 332, the sealing member 331 may seal against the seal 332, thereby preventing gas flow through the first valve 330 (i.e., the first valve 330 may be in closed configuration). Conversely, moving the sealing member 331 off the seal 332 (e.g., moving the ball in the proximal direction and compressing the spring 333) may form a suitable gap between the sealing member 331 and the seal 332 to allow gas to flow through the gap and through the first valve 330. It should be appreciated that the sealing member, described above as the sealing member 331, may have any number of suitable shapes and/or sizes.

In an embodiment, the expansion body 200 may define at least portion of the first valve 330. For example, the expansion body 200 may include a hollow protrusion 201 (e.g., extending in the proximal direction into the expansion chamber 210 of the expansion body 200), which forms a cavity that houses the sealing member 331, seal 332, and spring 333). For example, the spring 333 may be pressed against the sealing member 331 and together therewith enclosed in the cavity formed by a retention member 334, such that the spring 333 may force the sealing member 331 against the seal 332). The retention member 334 may have an opening therethrough, such that compressed gas may pass through the retention member 334, into the cavity defined by the hollow protrusion 201, through an orifice 202 (when the first valve 330 is open), and into the chamber 320 (e.g., the opening in the retention member 334 may define an inlet of the first valve 330).

The first valve 330 also may include orifice 202 (e.g., which may be defined by one or more portions of the expansion body 200). When the first valve 330 is in the open configuration, gas may flow through the orifice 202 into the chamber 320. Furthermore, in some embodiments, as described below in more detail, the first piston 310 includes one or more passageways therethrough. For example, the gas may flow through the orifice 202 and through one or more passageways of the first piston 310 and out of the first stage regulator 301 (as indicated with the arrows). After exiting the first stage regulator 301, the gas may flow into the second stage regulator 302, as described below.

The first stage regulator 301 may include a biasing member, such as a spring 340 that may press or bias the first piston 310 in the proximal direction. For example, the strength of the spring 340 and/or the compression of the spring 340 may be suitable to move the first piston 310 in the proximal direction when the pressure in the chamber 320 is below a selected pressure. Moreover, a portion of the first piston 310 may be sized to extend or pass through the orifice 202 and contact the sealing member 331 of the first valve 330.

For example, the spring 340 may push the first piston 310 in the proximal direction and thereby push the sealing member 331 in the proximal direction (e.g., overcoming the force applied by the spring 333 onto the sealing member 331), thereby opening the first valve 330 to allow the gas to flow through the orifice 202 into the chamber 320 and out of the first stage regulator 301 (e.g., downstream toward the gas outlet 120). Conversely, when the pressure in the chamber 320 is at least equal to the selected pressure, the pressure in the chamber 320 together with the force of the spring 333 applied onto the sealing member 331 and thereby applied onto the first piston 310 in the distal direction is sufficient to move the first piston 310 in the distal direction (and to compress the spring 340), thereby allowing the sealing member 331 to close the first valve 330 and stop gas flow through the first valve 330.

In the illustrated embodiment, the chamber 320 is partially defined by and between the expansion body 200 and an intermediate regulator body 220. Moreover, the expansion body 200 may connect to the intermediate regulator body 220. For example, connecting together the expansion body 200 and the intermediate regulator body 220 may define the chamber 320 therebetween. For example, at a distal end, the expansion body 200 may include a protrusion 203 that may define a portion of the chamber 320 (e.g., the protrusion 203 may be a tubular cylinder extending distally or away from the inlet of the pressure-regulating device 100). The intermediate regulator body 220 may include a protrusion 221 that may extend proximally or generally toward the protrusion 203. The first piston 310 is movable relative to the protrusions 203 and 221 and may seal against the inner walls of the protrusions 203 and 221. For example, suitable seals, such as O-rings, may form a seal between the first piston 310 and the inner surfaces of the protrusions 203 and 221, while allowing the first piston 310 to move in the proximal and distal directions relative to the protrusions 203 and 221.

The first piston 310 may include one or more passageways. For example, sealing the first piston 310 between the protrusions 203 and 221 also seals the passageways therebetween. In particular, the passageways of the first piston 310 together with the space defined by the protrusions 203 and 221 define the chamber 320. That is, for example, the pressurized gas in the chamber 320 acts onto the first piston 310 to apply a net force onto the first piston 310 in the distal direction (e.g., the surface area of the first piston 310 on the proximal side thereof, measured along one or more planes perpendicular to the downstream direction, may be greater than on the distal side, such that applying the same pressure on both sides results in net force applied onto the first piston 310 in the distal direction).

In some embodiments, the gas in the passageways of the first piston 310 is in fluid communication with the second stage regulator 302 (as described below) and is substantially prevented from exiting the chamber 320. Hence, for example, the pressure in the chamber 320 may be similar to or the same as the pressure at the inlet of the second stage regulator 302, in one or more portions of the second stage regulator 302, at the gas outlet 120, or combinations thereof.

For example, as mentioned above, the gas in the chamber 320 may apply pressure onto the first piston 310. In particular, inside the chamber 320, the first piston 310 may be configured to have a greater surface area on the proximal side (measured along one or more planes perpendicular to the downstream direction) than on the distal side. Hence, the pressurized gas in the chamber 320 may apply more force in the distal direction than in the proximal direction. Specifically, when the gas pressure in the chamber 320 is at least at a selected pressure (e.g., at a calibrated pressure), the force applied onto the first piston 310 by the pressurized gas together with the spring 333 biasing the sealing member 331 in the distal direction is sufficient to move the first piston 310 in the distal direction to a location that allows the sealing member 331 to seal against the seal 332. In other words, the combined force produced by the pressurized gas together with the force of the first valve 330 suitably compress the spring 340 to close the first valve 330.

Generally, any number of suitable mechanisms or connections may connect or secure together the expansion body 200 and the intermediate regulator body 220. In the illustrated embodiment, the expansion body 200 includes an outer threaded wall 204 that encloses the protrusion 203 and defines a male thread. Furthermore, the intermediate regulator body 220 may include a threaded wall 221 that defines a female thread, which is configured to mate with the male thread of the threaded wall 204 of the expansion body 200. Hence, the expansion body 200 and the intermediate regulator body 220 may be threadedly connected together.

In an embodiment, the spring 340 may be located in the space defined by and between the threaded walls 204 and 221 (e.g., as shown in FIG. 2A). Hence, for example, moving the expansion body 200 and the intermediate regulator body 220 closer together (e.g., by tightening together the threaded walls 204 and 221) may compress the spring 340, thereby increasing the force applied thereby onto the first piston 310. Conversely, loosening the threaded walls 204 and 221 (i.e., moving the expansion body 200 and intermediate regulator body 220 farther apart from each other) reduces compression of the spring 340, such that the spring 340 applies less force onto the first piston 310.

The first stage regulator 301 may be calibrated to produce a selected pressure in the chamber 320 (which may be similar to the pressure produced at the gas outlet 120). For example, when the gas in the chamber 320 is at the selected pressure, the pressurized gas together with the first valve 330 push the first piston 310 in the distal direction, such as to close the first valve 330 (and stop further flow of gas into the chamber 320). By contrast, when the gas pressure in the chamber 320 is below the selected pressure, the spring 340 moves the first piston 310 in the proximal direction to move the sealing member 331 off the seal 332 and open the first valve 330, to allow the gas to enter the chamber 320, until the pressure in the chamber 320 is increased to the selected pressure, which would close the first valve 330.

The selected pressure is based on and/or related to the force applied by the spring 340 onto the first piston 310. Hence, for example, changing the compression of the spring 340 may change the amount of force applied by the spring 340 onto the first piston 310, thereby changing the pressure required to close the first valve 330 (i.e., changing the selected pressure for moving the first piston 310 distally in the manner that closes the first valve 330). In some embodiments, the first stage regulator 301 may be calibrated to produce a selected output pressure by changing the compression of the spring 340 (e.g., by changing the distance between the expansion body 200 and the intermediate regulator body 220). That is, the amount of pressure decrease or reduction produced by the first stage regulator 301 may be changed by changing the compression of the spring 340.

It should be appreciated that the first stage regulator 301 may have any number of suitable biasing mechanisms that may force the first piston 310 in the proximal direction. Moreover, the biasing mechanisms may be adjustable to facilitate calibration of the output pressure of the first stage regulator. For example, the first piston 310 may be pneumatically biased (e.g., by a pneumatic cylinder) and the pressure in the pneumatic cylinder may be adjusted, such that the selected pressure in the chamber 320 may force the first piston 310 distally to close the first valve 330.

As mentioned above, the pressure regulator 300 may include the first stage regulator 301 and the second stage regulator 302. For example, after passing through the first stage regulator 301 (e.g., when the first valve 330 is open), the gas may enter the second stage regulator 302. Moreover, after passing through the second stage regulator 302, the gas may flow to the gas outlet 120 and to a device connected thereto. In the illustrated embodiment, the pressure regulator 300 includes a second valve 350 and a second piston 360 that is movable in proximal and distal directions to operate the second valve 350 (e.g., to open and close the second valve 350).

The gas that exits the first stage regulator 301 may flow to the second valve 350. Similar to the first valve 330, the second valve 350 may include a sealing member 351, a seal 352, and a spring 353 that may press the sealing member 351 against the seal 352, thereby producing a suitable seal therebetween to prevent or close gas flow through the second valve 350. In particular, the second stage regulator 302 may include an orifice 223, and the second valve 350 may control gas flow through the orifice 223.

In the illustrated embodiment, the intermediate regulator body 220 may define at least a portion of the second valve 350. For example, the intermediate regulator body 220 may have a cavity 224 that may house the sealing member 351, seal 352, and the spring 353. Furthermore, the second valve 350 may include a retention member 354 that may secure the spring 353 in the cavity 224, such that the spring 353 presses the sealing member 351 toward and/or against the seal 352 in the manner that may form a seal therebetween. The retention member 354 may include an opening therethrough.

The opening in the retention member 354 may define the inlet of the second valve 350. After exiting the first stage regulator 301, the gas may enter the second valve 350 of the second stage regulator 302. If the second valve 350 is in the open configuration (e.g., as shown in FIG. 2A) the gas may flow through the second valve 350 and through the second stage regulator 302 to the gas outlet 120. Conversely, if the second valve 350 is in the closed configuration, the gas in the cavity 224 of the second valve 350 is prevented from flowing through the second valve 350 (e.g., the pressure at the gas outlet 120 is not increased by the gas flow through the second valve 350).

As described above, the second piston 360 may move in the proximal direction to open the second valve 350 (e.g., to allow gas flow through the second valve 350 to the gas outlet 120, such as to increase the pressure as the gas outlet 120) and/or may move in the distal direction to close the second valve 350 (or to allow the second valve 350 to close) in the manner that the pressure at the gas outlet 120 is not increased from gas flow through the second valve 350 to the gas outlet 120. For example, the second piston 360 may include a portion that is sized to fit into and/or pass through the orifice 223 and contact the sealing member 351 of the second valve 350. Hence, similar to the chamber 320 of the first stage regulator 301, the second piston 360 may move in the proximal direction to press against the sealing member 351 (compressing the spring 353) to open the second valve 350 and allow the air to pass therethrough (e.g., as shown in FIG. 2A). Conversely, the second piston 360 may move in the distal direction to close the second valve 350 or to allow the second valve 350 to close (e.g., as shown in FIG. 2B).

In the illustrated embodiment, the second stage regulator 302 includes a biasing member, such as a spring 370 that is positioned and configured to press or bias the second piston 360 in the proximal direction. For example, when the pressure in the chamber 380 is below a selected pressure (e.g., as described below), the spring 370 generates sufficient force to move the second piston 360 in the proximal direction and push the sealing member 351 off the seal 352, thereby producing a gap between the sealing member 351 and seal 352 (or opening the second valve 350) and allowing gas to enter the chamber 380.

The chamber 380 may be in fluid communication with the gas outlet 120. Hence, for example, the gas pressure at the chamber 380 and at the gas outlet 120 may be similar or the same. For example, when the gas pressure at the gas outlet 120 is below the selected output pressure (e.g., at 0, 2 psi, etc.), the force applied by the spring onto the second piston 360 is sufficient to move the second piston 360 in the proximal direction and open the second valve 350. Conversely, when the pressure at the gas outlet 120 is at least at the selected pressure (and the pressure in the chamber 380 is generally the same as at the gas outlet 120), the pressurized gas forces the second piston 360 to move distally and allow the second valve 350 to close.

In the illustrated embodiment, the intermediate regulator body 220 includes a generally tubular section 225 (e.g., tubular section 225 may have a generally circular cross-section). Moreover, the intermediate regulator body 220 may connect to a regulator cap 230 and may collectively therewith define a cavity within which the second piston 360 may be located. In some embodiments, the regulator cap 230 may include an outer wall 231 that extends in the proximal direction and connects to the tubular section 225 of the intermediate regulator body 220 (e.g., the tubular section 225 may define an external thread, and the wall 231 of the regulator cap 230 may define an internal thread which may threadedly connect together). Additionally or alternatively, the regulator cap 230 may include a protrusion 232.

For example, the second piston 360 may seal against the inner surfaces of the tubular section 225 and protrusion 232 (e.g., by suitable seals, such as O-rings), such that the second piston 360 is movable relative to the tubular section 225 and protrusion 232 in proximal and distal directions. Sealing the second piston 360 against the tubular section 225 and the protrusion 232 forms the chamber 380 that is defined by the passageways in the second piston 360 and by the cavities formed by the seals. In an embodiment, the chamber 380 is defined by the passageways in the second piston 360 and the cavities formed by the seals between the second piston 360 and the tubular section 225 and protrusion 232. For example, when the pressure in the chamber 380 is below the selected pressure, the spring 370 may overcome the force applied by the pressurized gas onto the second piston 360, to move the second piston 360 in the proximal direction and open the second valve 350. When the pressure in the chamber 380 is at least at the selected pressure (e.g., at the pressure calibrated for the gas outlet 120), the force applied onto the second piston 360 in the distal direction (due to the larger surface area of the proximal side of the second piston 360 than on the distal side thereof) compresses the spring 370 and moves the second piston 360 in the distal direction, allowing the second valve 350 to close and prevent further pressure increase in the chamber 380 and at the gas outlet 120.

As such, for example, the pressure at the gas outlet 120, at which the second piston 360 may open the second valve 350 (i.e., the pressure at which the second piston 360 moves in the proximal), is related to or based on the force applied by the spring 370 onto the second piston 360 in the proximal direction. Hence, for example, increasing the force applied onto the second piston 360 in the proximal direction will increase the output pressure at the gas outlet 120 (i.e., the pressure required to close the second valve 350), and decreasing the force applied onto the second piston 360 will decrease the output pressure at the gas outlet 120.

In the illustrated embodiment, the spring 370 is located between the intermediate regulator body 220 and the regulator cap 230 (e.g., in the cavity formed by and between the wall 231 of the regulator cap 230 and the 225 of the intermediate regulator body 220). Hence, for example, changing the distance between the intermediate regulator body 220 and the regulator cap 230 may change the compression of the spring 370, thereby changing the amount of force applied thereby onto the second piston 360 in the proximal direction. Again, it should be appreciated that any number of suitable devices or mechanisms may be included in the second stage regulator 302 to apply a selected and/or changeable amount of force onto the second piston 360 in the proximal direction (e.g., the second stage regulator 302 may include a pneumatic piston that may apply a selected amount of force onto the second piston 360).

As mentioned above, the first stage regulator 301 and the second stage regulator 302 may be adjusted and/or calibrated to produce a selected outlet pressure at the gas outlet 120. Specifically, configuring the first stage regulator 301 and/or the second stage regulator 302 to produce the selected pressure may involve adjusting the amount of force applied onto the respective first piston 310 and second piston 360 thereof. For example, the distance between the expansion body 200 and the intermediate regulator body 220 may be adjusted to adjust or calibrate the amount of compression in the spring 340 and the amount of force applied thereby onto the first piston 310. Similarly, the distance between the intermediate regulator body 220 and the regulator cap 230 may be adjusted to adjust or calibrate the amount of compression in the spring 370 and the amount of force applied thereby onto the second piston 360 (e.g., to change the amount of pressure decrease or reduction produced by the second stage regulator 302).

Adjusting the distances between the expansion body 200 and the intermediate regulator body 220 and/or between the intermediate regulator body 220 and the regulator cap 230 adjusts or calibrates the pressure in the respective chamber 320 and chamber 380 of the first stage regulator 301 and second stage regulator 302, which is required to close first valve 330 and second valve 350. Under some operating conditions, the first piston 310 and the second piston 360 may move in proximal and distal directions, as pressure at the gas outlet 120 and at the respective chamber 320 and chamber 380 changes, such as to operate or open and close the first valve 330 and second valve 350 to increase the pressure in the chamber 320 and chamber 380 (and at the gas outlet 120) to the calibrated or selected pressure.

Again, the pressure in the chamber 320 and/or in the chamber 380 may be similar to or the same as the outlet pressure at the gas outlet 120. Hence, adjusting the forces applied onto the first piston 310 and/or second piston 360 (e.g., as described above) calibrates the pressure at the gas outlet 120. In an embodiment, a pressure gauge may be included in the pressure-regulating device 100 and/or connected thereto. For example, one or more portions of the pressure gauge may be in fluid communication with the outlet of the second stage regulator 302 and/or with the gas outlet 120. Hence, for example, the pressure-regulating device 100 may be calibrated to produce a selected outlet pressure at the gas outlet 120 by adjusting the forces applied onto the first piston 310 and/or second piston 360 (e.g., by changing compression of the spring 340 and/or spring 370, as described above).

In some embodiments, the pressure-regulating device 100 may include one or more locks that may lock the pressure-regulating device 100 (e.g., preventing gas flow through the first valve 330 and/or second valve 350). For example, the pressure-regulating device 100 may include a lock mechanism 600 that has an outer ring 610 and an inner ring 620 operably connected to the outer ring 610. As described below in more detail, the outer ring 610 may move the inner ring 620 in the distal direction, to engauge and move the first piston 310 in the distal direction, such that the first valve 330 is allowed close and remain closed. Moreover, the inner ring 620 may retain the first piston 310 at a distal position, such that the first piston 310 is prevented from engaging and opening the first valve 330. With the first valve 330 closed, gas flow to the gas outlet 120 is stopped.

In the illustrated embodiment, the lock mechanism 600 includes an exterior portion (i.e., the outer ring 610) and an interior portion (i.e., the inner ring 620), which is separated from the exterior portion by a portion of the expansion body 200. Specifically, the outer ring 610 may be positioned near and/or in contact with the first piston 310. It should be appreciated, however, that the interior portion of the lock mechanism 600 (i.e., the inner ring 620) is located outside of an airtight or sealed environment (e.g., outside of the chamber 320). Hence, the connection between the outer ring 610 and the inner ring 620 does not have to be airtight, to maintain the pressure in the sealed environment, such as in the chamber 320.

Figure 3A:
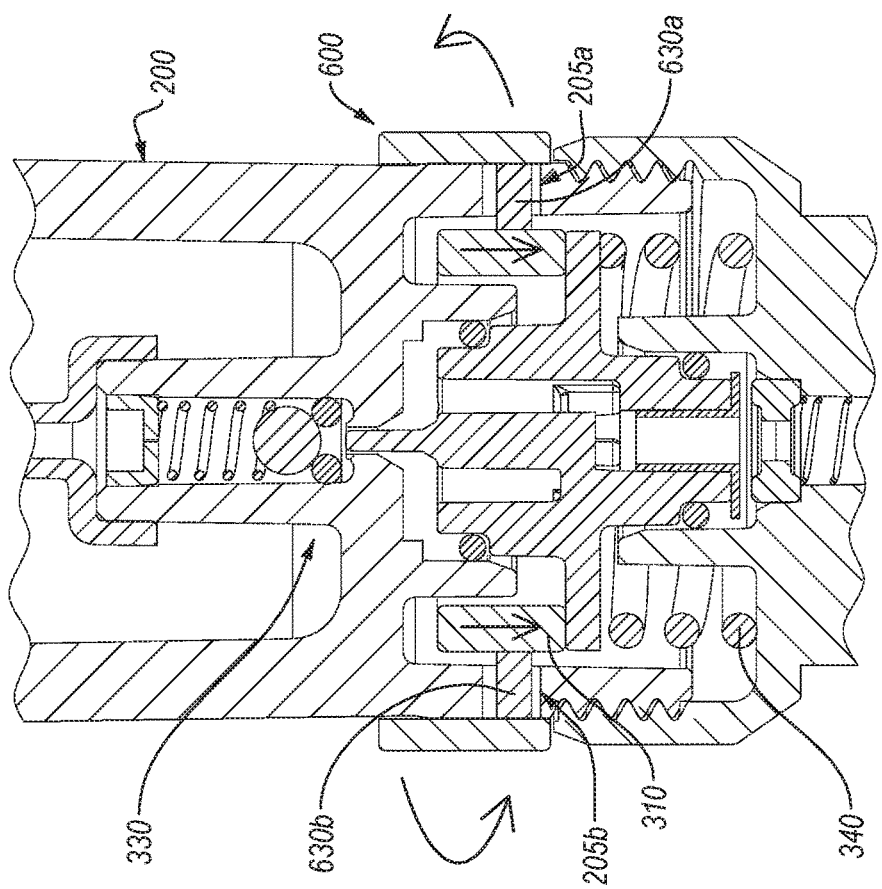
FIG. 3A is an enlarged, partial cross-sectional view of the pressure-regulating device of FIG. 1A in an unlocked configuration.
Figure 3B:
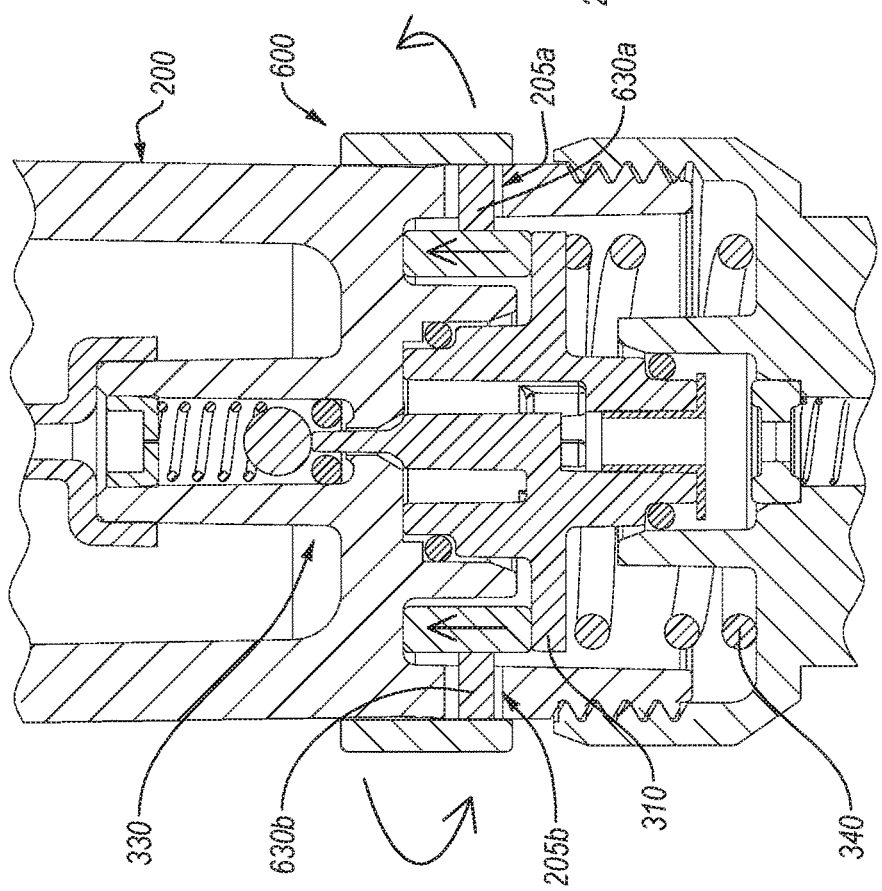
FIG. 3B is an enlarged, partial cross-sectional view of the pressure-regulating device of FIG. 1A in a locked configuration.

FIGS. 3A and 3B illustrate the lock mechanism 600 at unlocked and locked positions, respectively. Generally, the inner ring 620 may be moved distally to engauge the first piston 310 with any number of suitable mechanisms. In an embodiment, the expansion body 200 may include channels 205a, 205b that may guide and secure the outer ring 610 and inner ring 620 in the locked and unlocked positions. Specifically, the inner ring 620 may be connected to the outer ring 610 with connection posts 630a, 630b that may pass through the channels 205a, 205b.

As described below in more detail, the channels 402a, 204b may be slanted or angled along the length of the expansion body 200. For example, rotating the outer ring 610 relative to the expansion body 200, moves the connection posts 603a, 603b along the corresponding channels 205a, 205b; since the channels 205a, 205b are tilted, as the post 603a, 603b move radially about the expansion body 200, due to the tilt of the channels 205a, 205b, the posts also move axially. In an embodiment, the channels 205a, 205b may be tilted such that clockwise rotation advances the connection posts 603a, 603b together with the inner ring 620 in the distal direction (as shown in FIGS. 3A-3B), thereby locking or securing the first piston 310 in the locked position, to prevent gas flow through the first valve 330. Conversely, rotating the outer ring 610 in the counterclockwise direction may advance the connection posts 603, 603b together with the inner ring 620 in the proximal direction, thereby unlocking the first piston 310, and allowing the gas to flow through the first valve 330, as may be regulated by the first piston 310 (as described above).

It should be appreciated that the channels may have suitable orientations, such that rotating the outer ring 610 clockwise would unlock the first piston 310 and rotating the outer ring 610 counterclockwise would lock the first piston 310. Moreover, additional or alternative suitable lock mechanisms may be included in the pressure-regulating device. Suitable lock mechanisms include threaded mechanism with slidable connectors, toggle locks, etc.

Figure 4A:
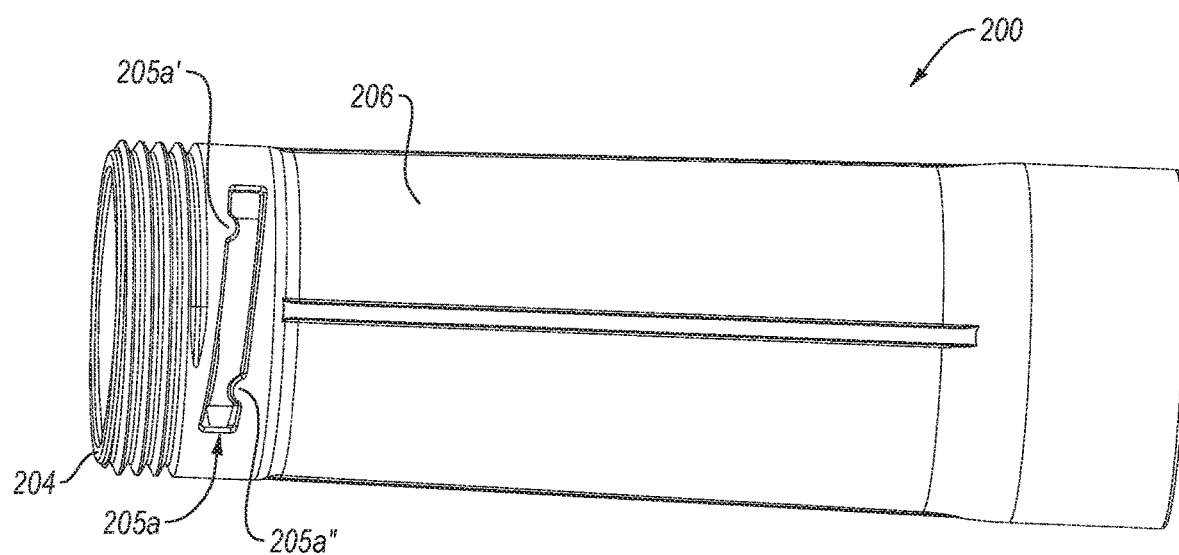
FIG. 4A is a front perspective view of an expansion body of a pressure-regulating device according to an embodiment.
Figure 4B:
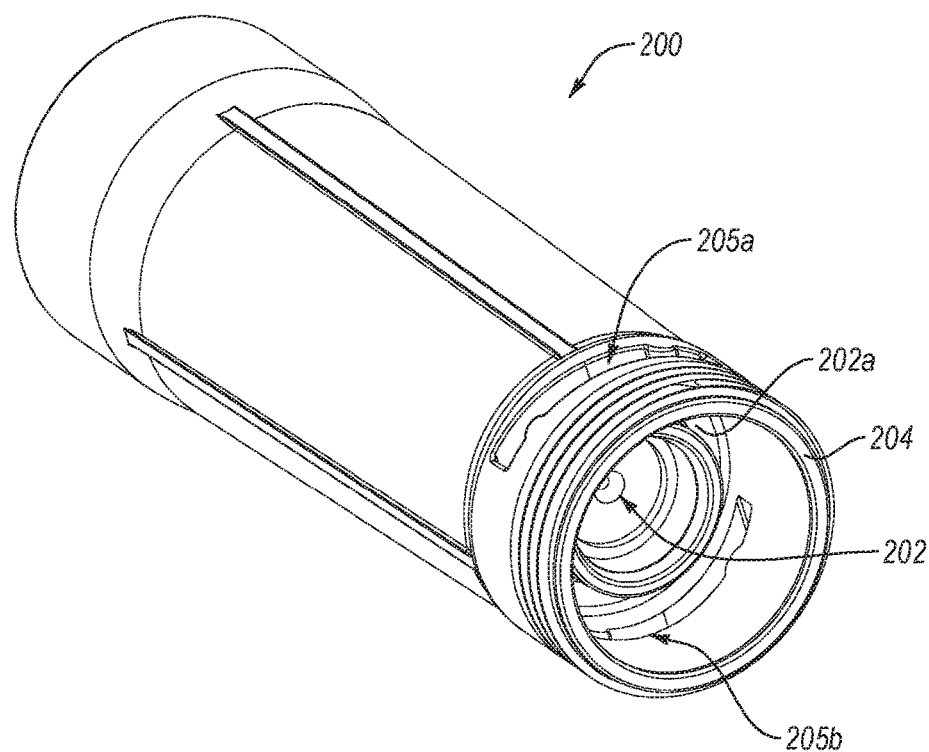
FIG. 4B is a side perspective view of the expansion body of FIG. 4A.
Figure 4C:
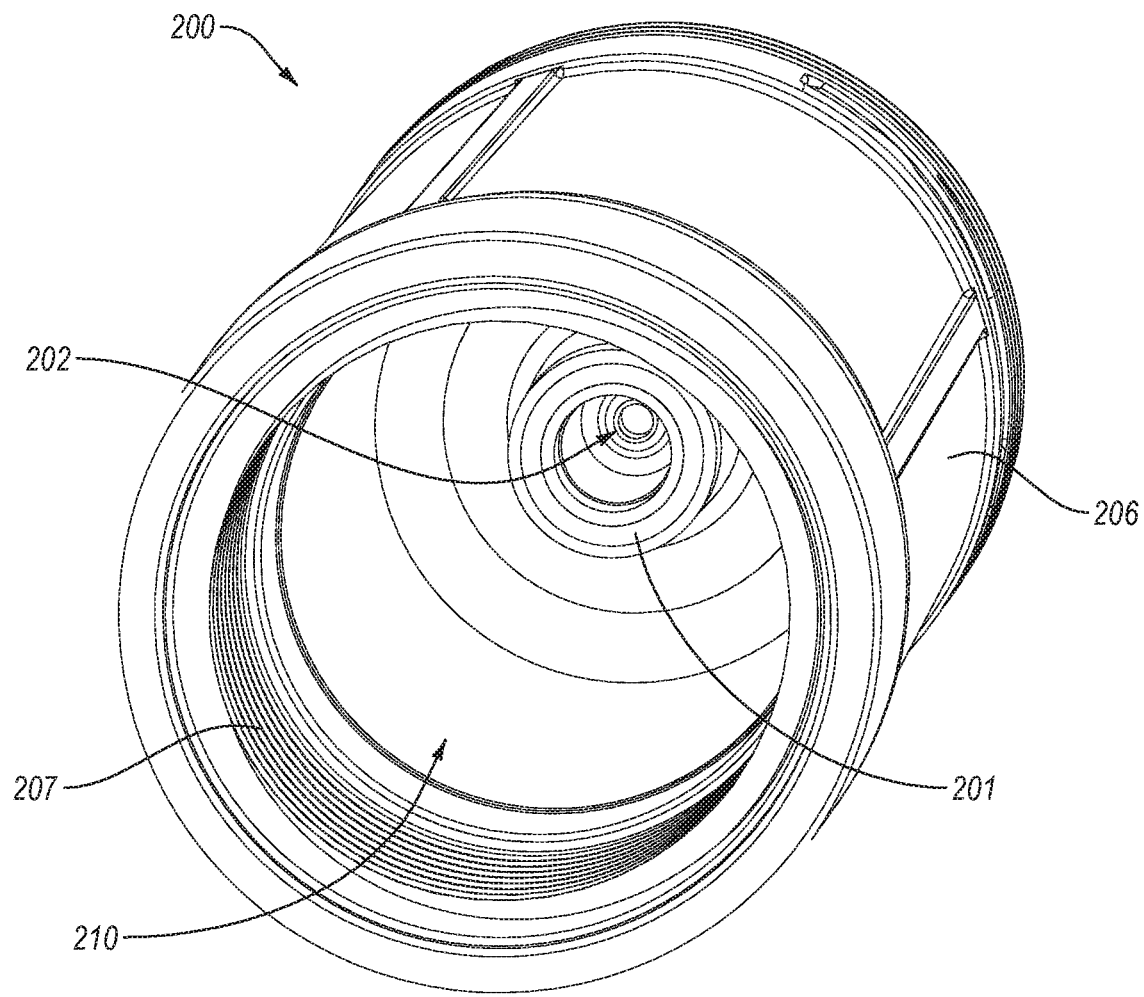
FIG. 4C is a back perspective view of the expansion body of FIG. 4A.

FIGS. 4A-4C illustrate the expansion body 200. For example, FIG. 4A is a side, perspective view of the expansion body 200, oriented such that the channel 205a is visible; FIG. 4B is a distal perspective view of the expansion body 200; and FIG. 4C is a proximal perspective view of the expansion body 200. As shown in FIGS. 4A-4B, the channels 205a, 205b are slanted axially. Moreover, the slant of the channel 205a is such that the connection posts 630a, 630b (FIGS. 3A-3B) may travel a suitable distance, such that the inner ring of the lock mechanism moves between locked and unlocked positions (as described above).

For ease of description, the following describes only a single channel, the channel 205a. It should be appreciated, however, that the channel 205b (FIG. 4B) may be located on an opposite side to the channel 205a and may be the same as the channel 205b. Moreover, channels 205a, 205b may have the orientation such that the radial movement of the opposing connection posts (as the outer ring rotates) produces the same axial movement thereof.

In the illustrated embodiment, the expansion body 200 may have protrusions 205a', 205a" that extend into the channel 205a. For example, the protrusion 205a' may be positioned near an upper end of the channel 205a, such that the connecting post may pass the protrusion 205a' and may be prevented thereby from moving along the channel 205a (e.g., the protrusion 205a' may selectively retain the lock mechanism in the unlocked position). Similarly, the protrusion 205a" may be positioned near the lower end of the channel 205a, such that the connecting post may pass the protrusion 205a" and may be selectively secured thereby (e.g., such that the lock mechanism is selectively secured in the locked position). It should be appreciated that any number of suitable elements and/or mechanisms may secure the lock mechanism in the locked and/or unlocked position (e.g., notches, set screws, detent mechanisms, etc.).

Generally, the lock mechanism may be located at any suitable location on the pressure-regulating device. In an embodiment, the lock mechanism may be positioned near the first valve (e.g., near the distal end of the expansion body 200). For example, the channel 205a may be located near the threaded wall 204 and/or orifice 202 of the expansion body 200. In additional or alternative embodiments, the lock mechanism may be positioned farther from the distal end of the expansion body 200.

The expansion body 200 defines the expansion chamber 210 (FIG. 4C). For example, the expansion body 200 may include at least one wall 206 (e.g., generally cylindrical, tubular wall) that partially defines the expansion chamber 210. Moreover, the expansion body 200 may include an end wall 202a, closing off the expansion chamber 210 on a distal end thereof. Moreover, the end wall 202a may define the orifice 202. At the proximal end, the expansion body 200 may include a connection location (e.g., a thread 207 (FIG. 4C) for connecting a cap, thereby enclosing the expansion chamber 210 on the proximal side thereof.

Figure 5:
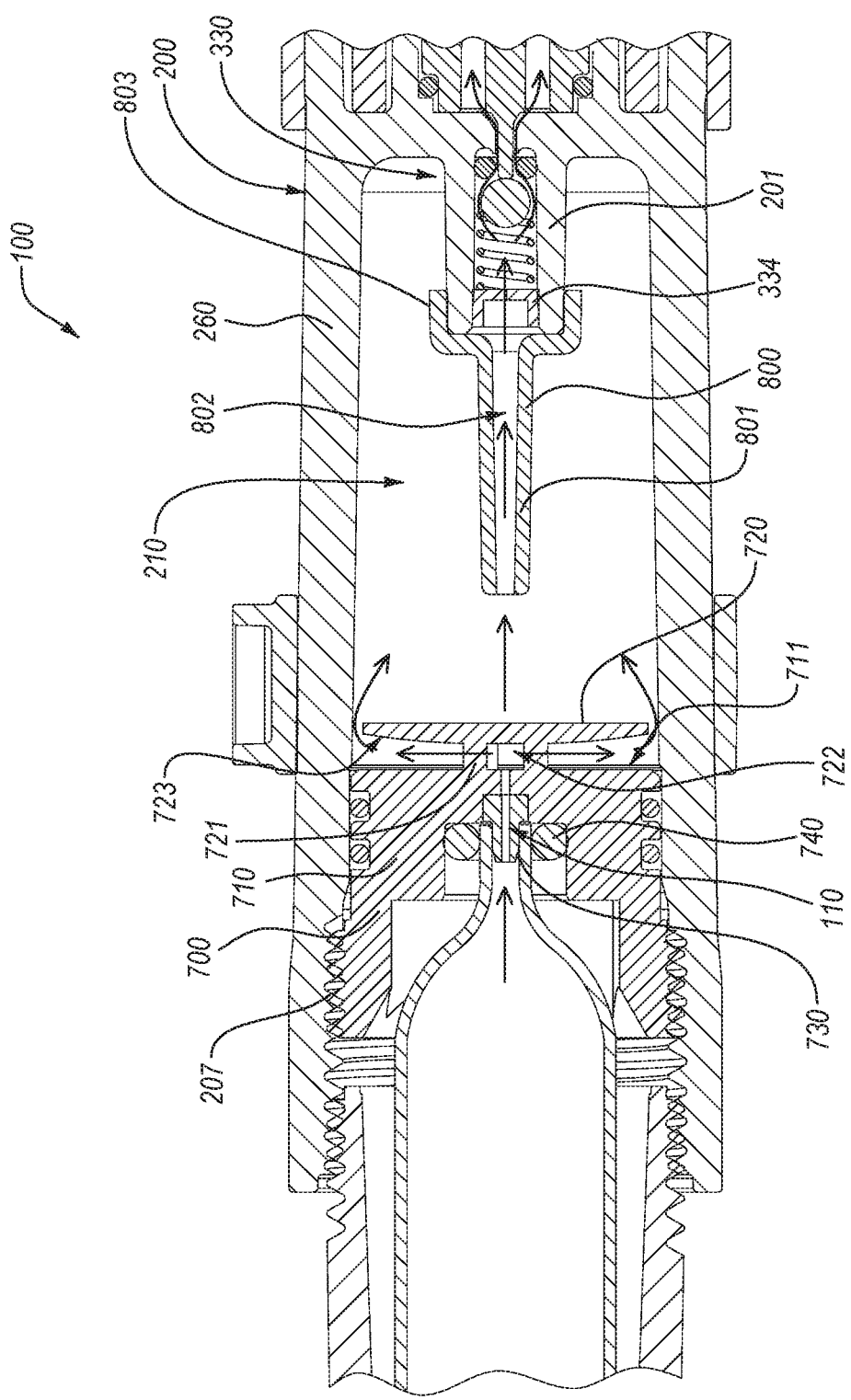
FIG. 5 is an enlarged, partial cross-sectional view of the pressure-regulating device of FIG. 1A.

In some embodiments, the pressure-regulating device may include a baffle or deflector to facilitate gas flow. FIG. 5 is a cross-sectional view of a portion of the pressure-regulating device 100. As shown in FIG. 5, the pressure-regulating device 100 includes an inlet deflector 700 secured at the proximal end of the expansion body 200 and enclosing the expansion chamber 210. For example, the inlet deflector 700 may include a thread that corresponds to and mates with the thread 207, thereby securing the inlet deflector 700 to the expansion body 200.

Generally, the inlet deflector 700 may include a solid body 710 that defines the inlet gas inlet 110. Gas flow through the inlet deflector 700 is shown schematically with the arrows. In the illustrated embodiment, the inlet deflector 700 includes a baffle 720 positioned downstream from the inlet gas inlet 110. For example, a mounting 721 may secure the baffle 720 to the solid body 710. The mounting 721 may be operably connected to and/or integrated with the solid body 710. For example, the mounting 721 may define one or more openings 722 that are operably connected to or in fluid communication with the gas inlet 110 (e.g., gas may flow through the gas inlet 110, through the openings 722, about the baffle 720, and into the expansion chamber 210). In an embodiment, the openings 722 may be oriented substantially perpendicularly to the flow of gas at the gas inlet 110 (e.g., perpendicularly to the axis of the pressure-regulating device 100).

Generally, the baffle 720 may have any number of suitable shapes and/or sizes. In an embodiment, the baffle 720 may be disc-shaped. Moreover, the size of the baffle 720 may be such as to leave a suitable space between the edges or periphery thereof and the inner surface of the wall 206 that defines the expansion chamber 210 (e.g., such as to produce suitable gas flow in the gap defined by and between the peripheral shape of the baffle 720 and the inner surface of the expansion chamber 210).

In an embodiment, the baffle 720 may have an angled or semi-spherical proximal surface 723 (e.g., surface closer to the gas inlet 110). For example, the proximal surface 723 of the baffle 720 may be oriented at a non-perpendicular angle relative to the direction of flow of the gas at the gas inlet 110 of the pressure-regulating device 100. Moreover, the solid body 710 may have a distal surface 711 opposite to the proximal surface of the baffle 720, such as to define a space between the proximal surface of the baffle 720, through which the gas may flow after exiting the opening 722. The proximal surface 723 of the baffle 720 may be spaced from the distal surface 711 of the solid body 710 by a suitable distance to facilitate the flow of gas into the expansion chamber 210.

Generally, the inlet deflector 700 may be sealed against the expansion body 200 on the proximal side thereof (e.g., such that the gas in the expansion chamber 210 is prevented from leaking out on the proximal side of the expansion chamber 210). In the illustrated embodiment, O-rings form a seal between the outer surface of the inlet deflector 700 and the inner surface of the wall 206, in the manner that prevents gas from leaking or exiting the expansion chamber 210 on the proximal side of the expansion chamber 210. It should be appreciated that any number of suitable seals may be formed between the inlet deflector 700 and the expansion body 200 (e.g., the inlet deflector 700 and the expansion body 200 may have tapered pipe thread that may be suitable to seal the expansion chamber 210 in the manner that prevents gas from exiting the expansion chamber 210 on the proximal side thereof.

In an embodiment, the gas source may be a gas cartridge (e.g., a $CO_2$ gas cartridge). Under some operating conditions, the gas cartridge may require penetration to allow the gas contained therein to exit and flow into the pressure-regulating device 100. For example, the inlet deflector 700 may include a penetrator 730 that may be operably secured thereto and/or integrated therewith. The penetrator 730 may penetrate the gas cartridge seal to allow the gas in the gas cartridge to flow into the gas inlet 110. The penetrator 730 may be hollow and may be fluidly connected to and/or define at least a portion of the gas inlet 110.

Moreover, the inlet deflector 700 may include a seal located near and/or around the penetrator. For example, an O-ring 740 may surround the penetrator 730 and may seal about the gas cartridge, thereby preventing or limiting gas leakage between the gas cartridge and the penetrator 730 (e.g., such that the gas is forced to flow into the gas inlet 110).

As mentioned above, the gas may flow from the expansion chamber 210 into the hollow protrusion 201 of the first valve 330. In an embodiment, the pressure-regulating device 100 may include a regulator-inflow member 800 operably connected to the hollow protrusion 201. Generally, the regulator-inflow member 800 may extend outward from the protrusion 201 and from the first valve 330, in the proximal direction, into the expansion chamber 210.

For example, the regulator-inflow member 800 may have a wall 801 that defines a passageway 802, through which gas in the expansion chamber 210 may flow toward and/or into the first valve 330. The regulator-inflow member 800 may have any number of suitable shapes. For example, the regulator-inflow member 800 may be a tapered tube (e.g., a conical tapered tube), such that at a proximal end (i.e., at the location for entry of the gas from the expansion chamber 210), the regulator-inflow member 800 and the opening therein is narrower than at locations distally therefrom.

The regulator-inflow member 800 may be connected and/or secured to the hollow protrusion 201 with any number of suitable mechanisms. In the illustrated embodiment, the regulator-inflow member 800 includes a socket 803 that may wrap about at least a portion of the hollow protrusion 201. For example, the hollow protrusion 201 may have a generally cylindrical outer surface; the socket 803 may have a complementary shape to the hollow protrusion 201 and may at least partially seal thereabout, such as to direct the gas in the expansion chamber 210 into the pressure regulator (e.g., into the first valve 330).

Figure 6:
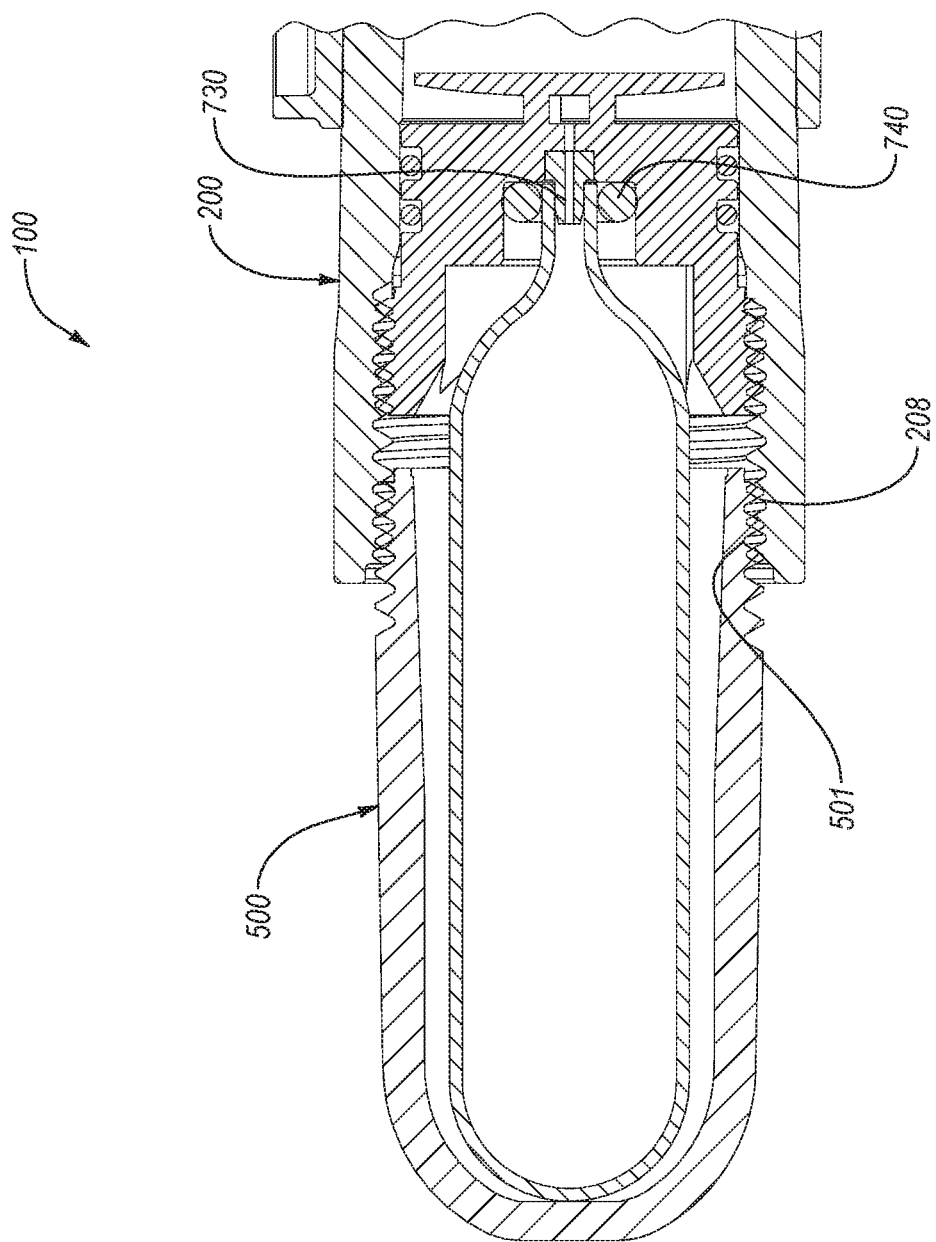
FIG. 6 is another enlarged, partial cross-sectional view of the pressure-regulating device of FIG. 1A, showing a pressurized cylinder and a portion of an expansion chamber of the pressure-regulating device.

Generally, any gas source may be operably connected to the pressure-regulating device 100, to supply the gas into the expansion chamber 210. As described above, in at least one embodiment, a gas cartridge may be connected to the pressure-regulating device 100. FIG. 6 is a cross-sectional view of a portion of the pressure-regulating device 100, near the proximal end thereof. In the illustrated embodiment, the pressure-regulating device 100 includes the gas cartridge cap 500 that is generally shaped and sized to house a complementary-shaped gas cartridge. For example, the gas cartridge cap 500 may be secured to the expansion body 200 of the pressure-regulating device 100, thereby securing the gas cartridge to the pressure-regulating device 100 (e.g., such as to maintain the seal with the O-ring 840).

In an embodiment, the gas cartridge cap 500 includes a threaded section 501, and the expansion body 200 includes a correspondingly threaded section 208 (e.g., the threaded section 501 of the gas cartridge cap 500 may have a male thread, and the threaded section 208 of the expansion body 200 may have a female thread). For example, screwing together and/or tightening the gas cartridge cap 500 and the expansion body 200 may secure the gas cartridge to and/or in the pressure-regulating device 100. Moreover, screwing together and/or tightening the gas cartridge cap 500 and the expansion body 200 may press the gas cartridge against the penetrator 730, thereby puncturing the seal of the gas cartridge and sealing the gas cartridge against the O-ring 840.

Referring back to FIGS. 2A-2B, as described above, the pressure-regulating device 100 may include the first stage regulator 301 and second stage regulator 302. Generally, the pressure-regulating device 100 may have any number of stages. Moreover, the pistons for one or more of the stage regulators of the pressure-regulating device 100 may have any number of suitable shapes and/or configurations. For example, the pistons of the first and/or second stage regulators of the pressure-regulating device 100 may have greater surface area on the proximal side thereof than on the distal side thereof. Additionally or alternatively, the pistons may have one or more passageways therethrough, to allow or facilitate gas flow through the piston and to the next stage or to the gas outlet 120 of the pressure-regulating device 100.

Figure 7A:
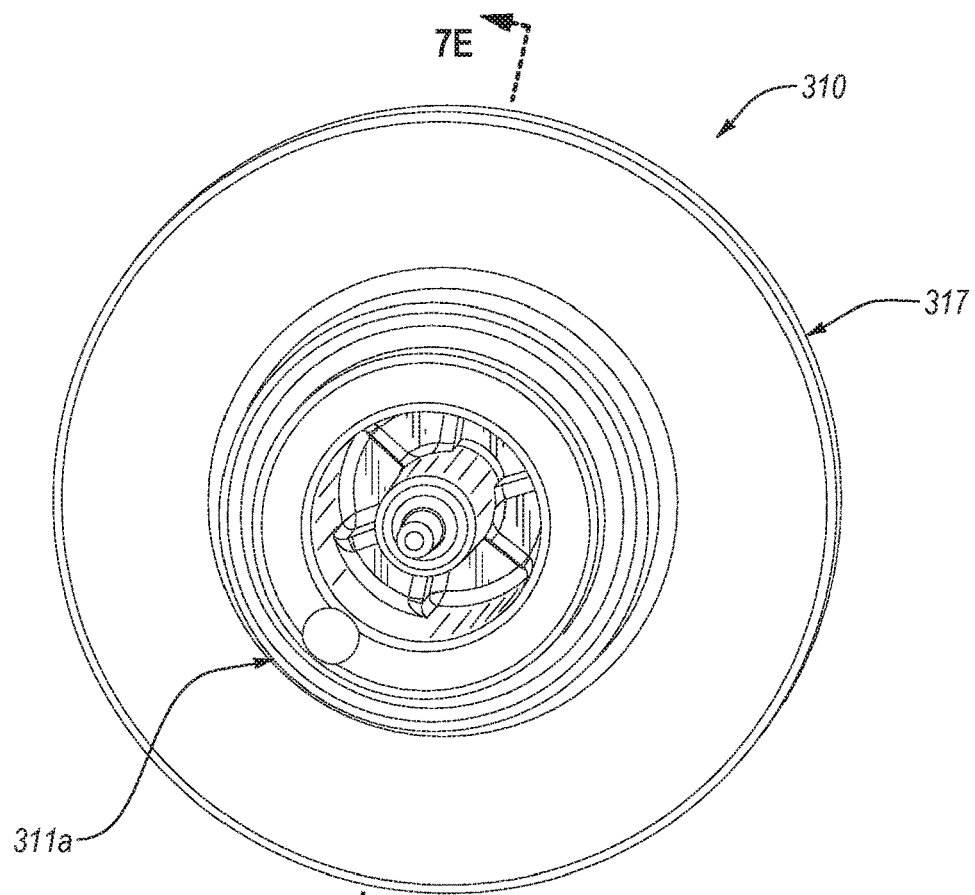
FIG. 7A is a top, perspective view of a piston of a pressure-regulating device according to an embodiment.
Figure 7B:
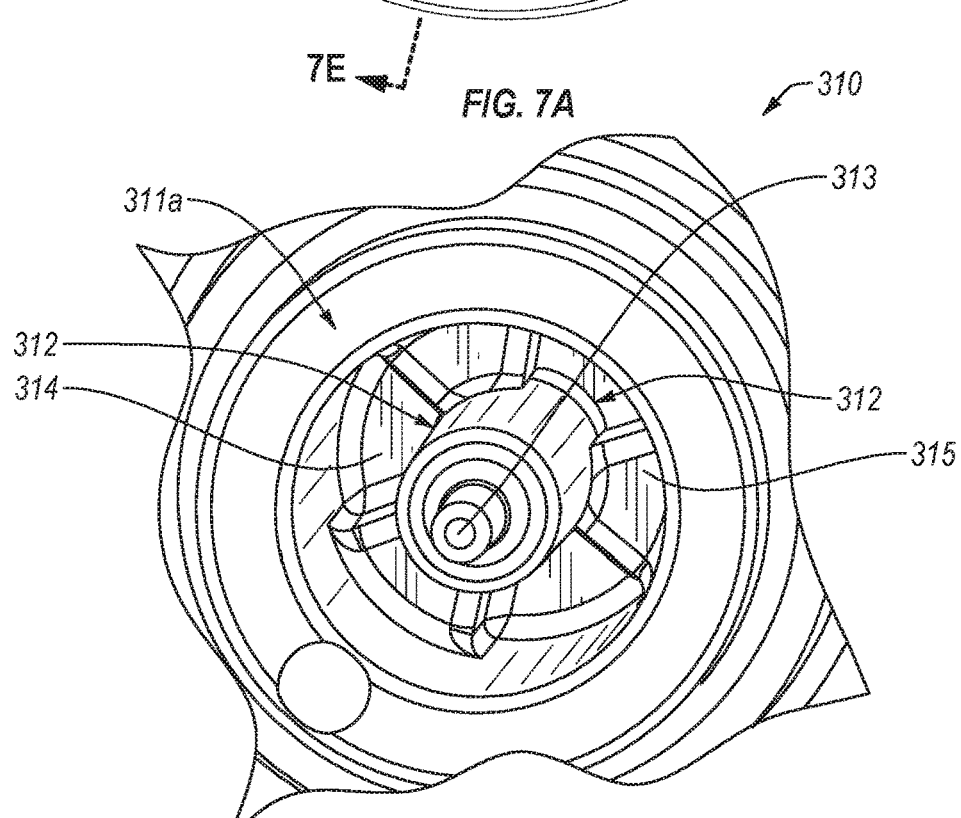
FIG. 7B is an enlarged, partial perspective view of the piston of FIG. 7A.
Figure 7C:
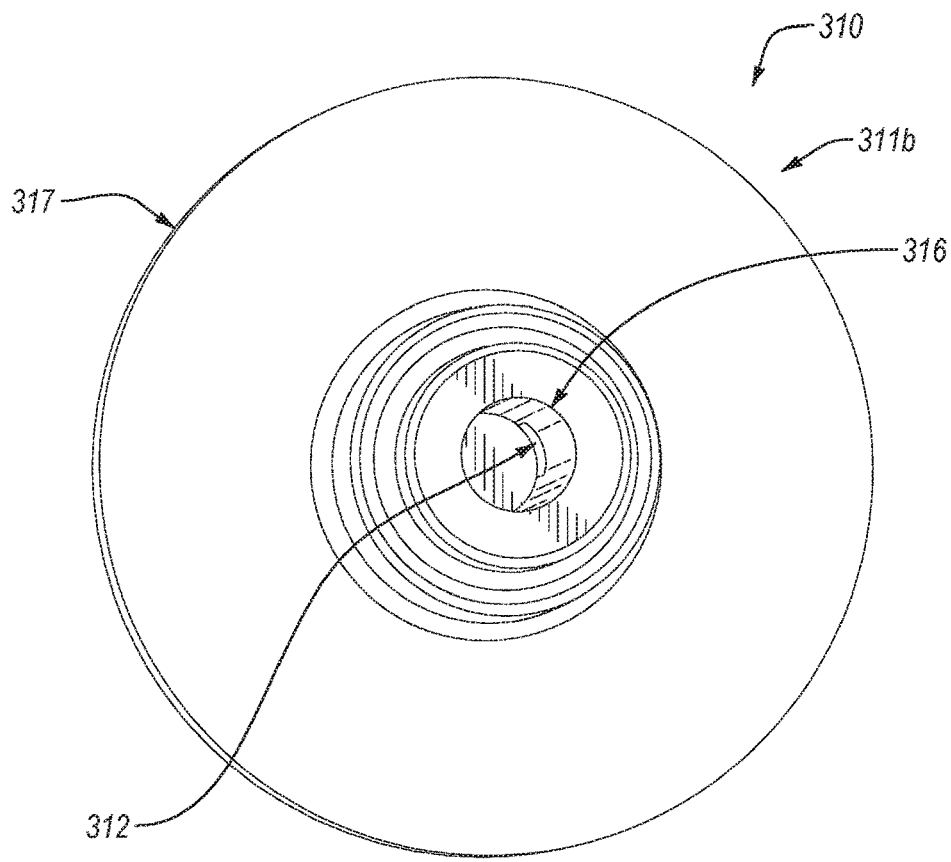
FIG. 7C is a back, perspective view of the piston of FIG. 7A.
Figure 7D:
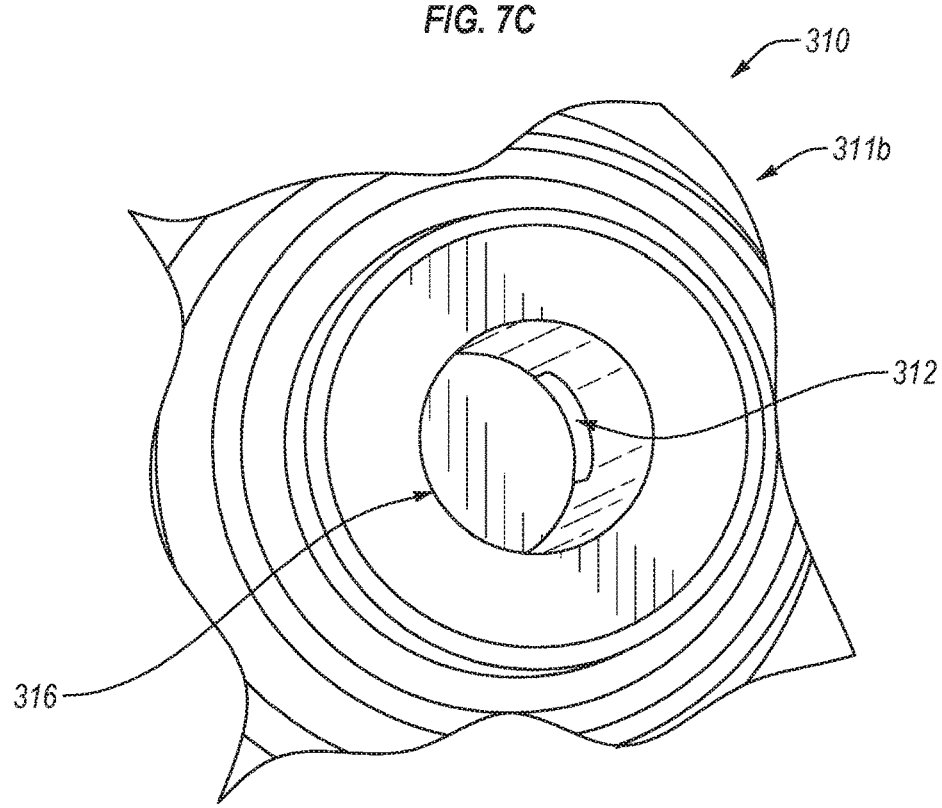
FIG. 7D is an enlarged, partial perspective view of the piston of FIG. 7C.
Figure 7E:
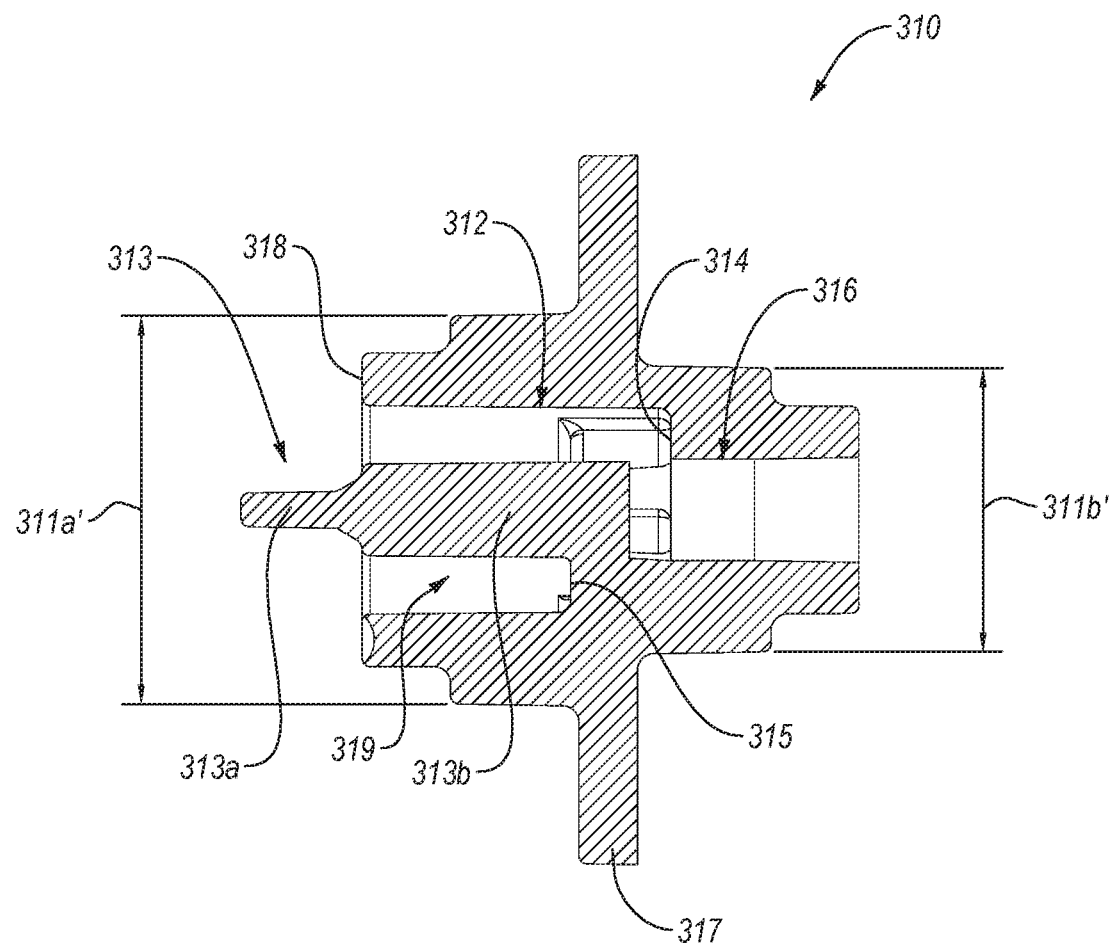
FIG. 7E is a cross-sectional view of the piston of FIG. 7A.

FIGS. 7A-7E illustrate the first piston 310 of the first stage regulator, according to an embodiment. FIG. 7A is a view of the proximal side 311a of the first piston 310; FIG. 7B is a view of an enlarged portion of the proximal side 311a of the first piston 310. FIG. 7C is a view of the distal side 311b of the first piston 310; FIG. 7D is a view of an enlarged portion of the distal side 311b of the first piston 310. FIG. 7E is a cross-sectional view of the first piston 310.

In an embodiment, the first piston 310 includes multiple passages 312 defined between a center stem 313 and alternating recessed surfaces 314 and raised surfaces 315. The recessed surfaces 314 and raised surfaces 315 may be recessed from a top surface 318 of the first piston 310 on the proximal side 311a thereof. Moreover, the recessed surfaces 314 and raised surfaces may define a bottom (e.g., an uneven bottom) of a recess 319 (e.g., the recessed surfaces 314 and the raised surfaces 315 may be recessed from the top surface by different distances).

In the illustrated embodiment, the first piston 310 includes three passageways 312. The passageways 312 may be formed between the recessed surfaces 314 and the center stem 313. Moreover, the passageways 312 may connect to an outlet passageway 316 (e.g., after exiting from the outlet passageway 316, the gas may flow to the subsequent stage). It should be also appreciated that the first piston 310 may have any number of passageways. In the illustrated embodiment, the total surface area of the proximal side 311a, which is oriented generally perpendicularly to the movement of the first piston 310, lies inside the outer circumference 311a' (FIG. 7E). The total surface area of the distal side 311b, which is oriented generally perpendicularly to the movement of the first piston 310, lies inside the outer circumference of the 311b' (FIG. 7E).

As described above, a portion of the first piston 310 may be sized and configured to fit into the orifice 202 (FIGS. 2A-2B). For example, at least part of the center stem 313 may be sized and configured to fit into the orifice. In the illustrated embodiment, an upper portion 313a of the center stem 313 is smaller than the lower portion 313b thereof, and the upper portion 313a of the center stem 313 is sized and shaped to fit into the orifice.

As described above, the first piston 310 may be biased in the proximal direction by a compressed spring. As shown in the illustrated embodiment, the first piston 310 may include a flange 317 that may support the spring. For example, flange 317 may be suitably sized to support the spring, such that the spring may press against the flange 317 and bias the first piston 310 in the proximal direction.

Figure 8A:
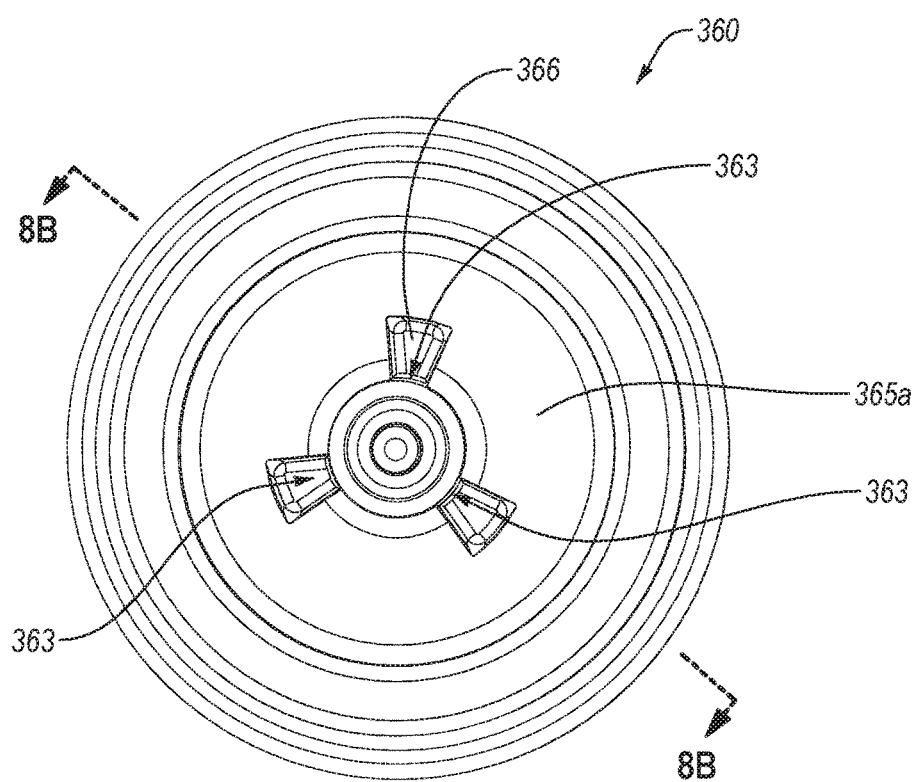
FIG. 8A is a top view of a piston of a pressure-regulating device according to an embodiment.
Figure 8B:
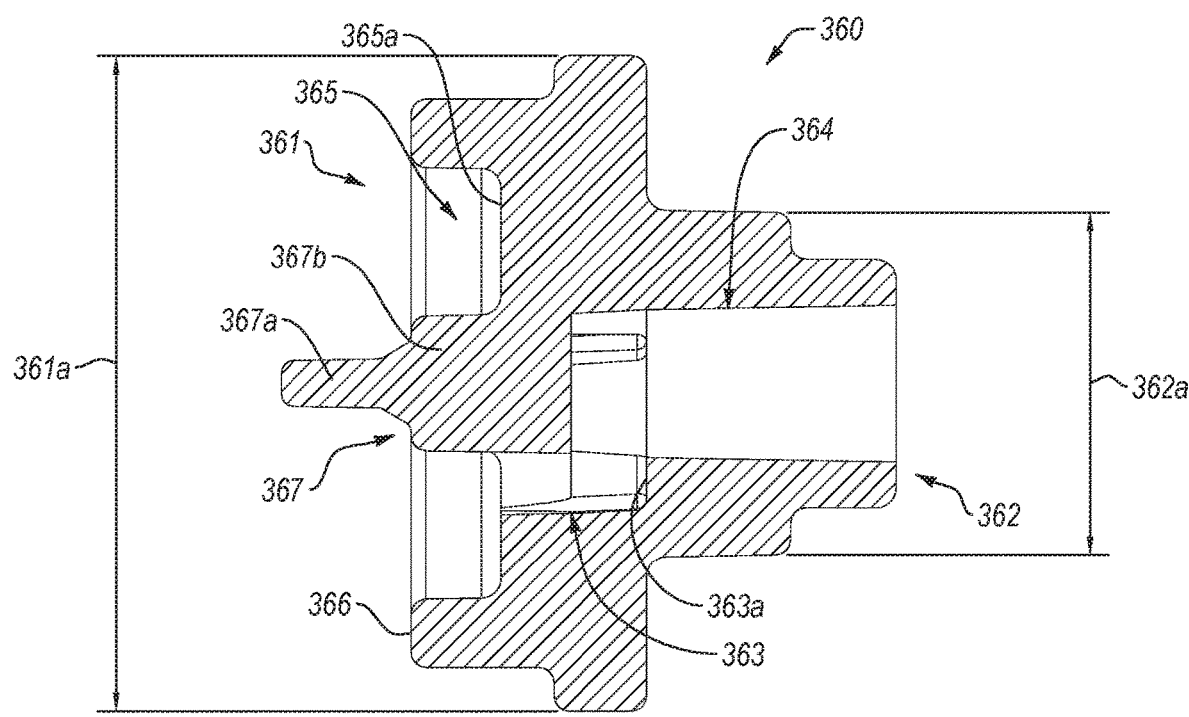
FIG. 8B is a cross-sectional view of the piston of FIG. 8A.

FIGS. 8A-8B illustrate the second piston 360 of the second stage regulator. FIG. 8A is a top view of the second piston 360; FIG. 8B is a cross-sectional view of the second piston 360. Similar to the first piston 310 (FIGS. 7A-7E), the second piston 360 may have a larger surface area on a proximal side 361 of the second piston 360 than on distal side 362. Moreover, the second piston 360 may include one or more passageways 363 connected to and/or in fluid communication with an outlet passageway 364. As described above, gas flowing out of the outlet passageway 364 may flow to the gas outlet of the pressure-regulating device (e.g., when the second piston 360 is included in the second stage regulator of the two stage regulator pressure regulator).

In the illustrated embodiment, the total surface area of the proximal side 361, which is oriented generally perpendicularly to the movement of the second piston 360, lies inside the outer circumference 361a (FIG. 8B). The total surface area of the distal side 362, which is oriented generally perpendicularly to the movement of the second piston 360 lies inside the outer circumference 362a (FIG. 7E) of the second piston 360.

In an embodiment, the second piston 360 includes a generally annular recess 365 (e.g., the recess may be defined between top surface 366 and a recessed surface 365a. Moreover, the second piston 360 may include further recesses that define the passageways 363, which may be formed by recesses from or in the recessed surface 365a to lower recessed surface 363a. Hence, the gas may flow into the recess 366, into the passageways 363, and out of the outlet passageway 364 of the second piston 360.

The second piston 360 may include a center stem 367; the passageways 363 may be located about the 367. In the illustrated embodiment, the second piston 360 has three passageways 363. It should be appreciated that the second piston 360 may have fewer or more than three passageways, in additional or alternative embodiments.

As described above, a portion of the second piston 360 may be sized and configured to fit into the orifice 223 (FIGS. 2A-2B). For example, at least part of the center stem 367 may be sized and configured to fit into the orifice. In the illustrated embodiment, an upper portion 367a of the center stem 367 is smaller than the lower portion 367b thereof, and the upper portion of the 367a is sized and shaped to fit into the orifice.

As described above, the pressure-regulating device may include and/or may be operably coupled to a pressure gauge, such as the pressure gauge 400, to facilitate calibration of the device. FIGS. 9A-9C illustrate the pressure gauge 400, according to an embodiment. FIG. 9A is a front view of the pressure gauge 400; FIG. 9B is a cross-sectional view of the pressure gauge 400 at a first pressure $P_1$; and FIG. 9C is a cross-sectional view of the pressure gauge 400 at a second pressure $P_2$ that is greater than the first pressure $P_1$.

As described above, a portion of the pressure gauge 400 may be defined by the regulator cap 230 (e.g., which may connect to the intermediate regulator body 220 (FIGS. 2A-2B)). An end cap 410 may be connected to the regulator cap 230, and together, the end cap 410 and regulator cap 230 may enclose and/or secure an indicator piston 420. Specifically, the gas pressure experienced at the gas outlet 120 may be approximately the same as the pressure experience by the indicator piston 420.

In the illustrated embodiment, the pressure gauge 400 includes a spring 430 that biases the indicator piston 420 in the proximal direction. The spring 430 may be selected and/or calibrated (e.g., shortened, pre-compressed, etc.) such that the indicator piston 420 moves in the distal direction (or outward relative to the end cap 410) by a selected amount or distance that corresponds to a selected pressure (e.g., the distance by which indicator piston 420 moves distally in response to application of pressure may be proportional to the applied pressure).

The indicator piston 420 may include a scale 440 thereon (e.g., printed, attached, etc.). As the indicator piston 420 moves outward relative to the end cap 410, graduations or indications on the scale 440 become visible and may be identified as corresponding to the detected or determined pressure. For example, in FIG. 9B the pressure gauge 400 indicates the first pressure $P_1$, and the scale 440 is exposed in the manner that identifies the first pressure $P_1$ (e.g., to user or operator of the pressure-regulating device); in FIG. 9B the pressure gauge 400 indicates the second pressure $P_2$, and the scale 440 is exposed in the manner that identifies the second pressure $P_2$ ($P_2 > P_1$).

In an embodiment, the pressure gauge 400 includes a pressure seal 450 that may be located at a proximal end of the indicator piston 420 (e.g., near the gas outlet 120). For example, the pressure seal 450 may seal against the inside wall of the regulator cap 230, which defines the chamber within which the indicator piston 420 and pressure seal 450 are positioned. For example, the pressurized gas may apply pressure onto the pressure seal 450, and the pressure seal 450 may apply a force onto the indicator piston 420 in the distal direction (e.g., proportional to the area of the pressure seal 450). In an embodiment, the indicator piston 420 may be at least partially hollow and one or more portions of the pressure seal 450 may be fitted inside at least a portion of the hollow space or cavity of the pressure seal 450 (thereby connecting together the pressure seal 450 and the indicator piston 420). In any event the pressure seal 450 may be advanced in the distal direction together with indicator piston 420, thereby move the indicator piston 420 and exposing the scale 440 thereof, in the manner that indicates the applied pressure (e.g., the pressure at or near the gas outlet 120).

Figures 10A, 10B:
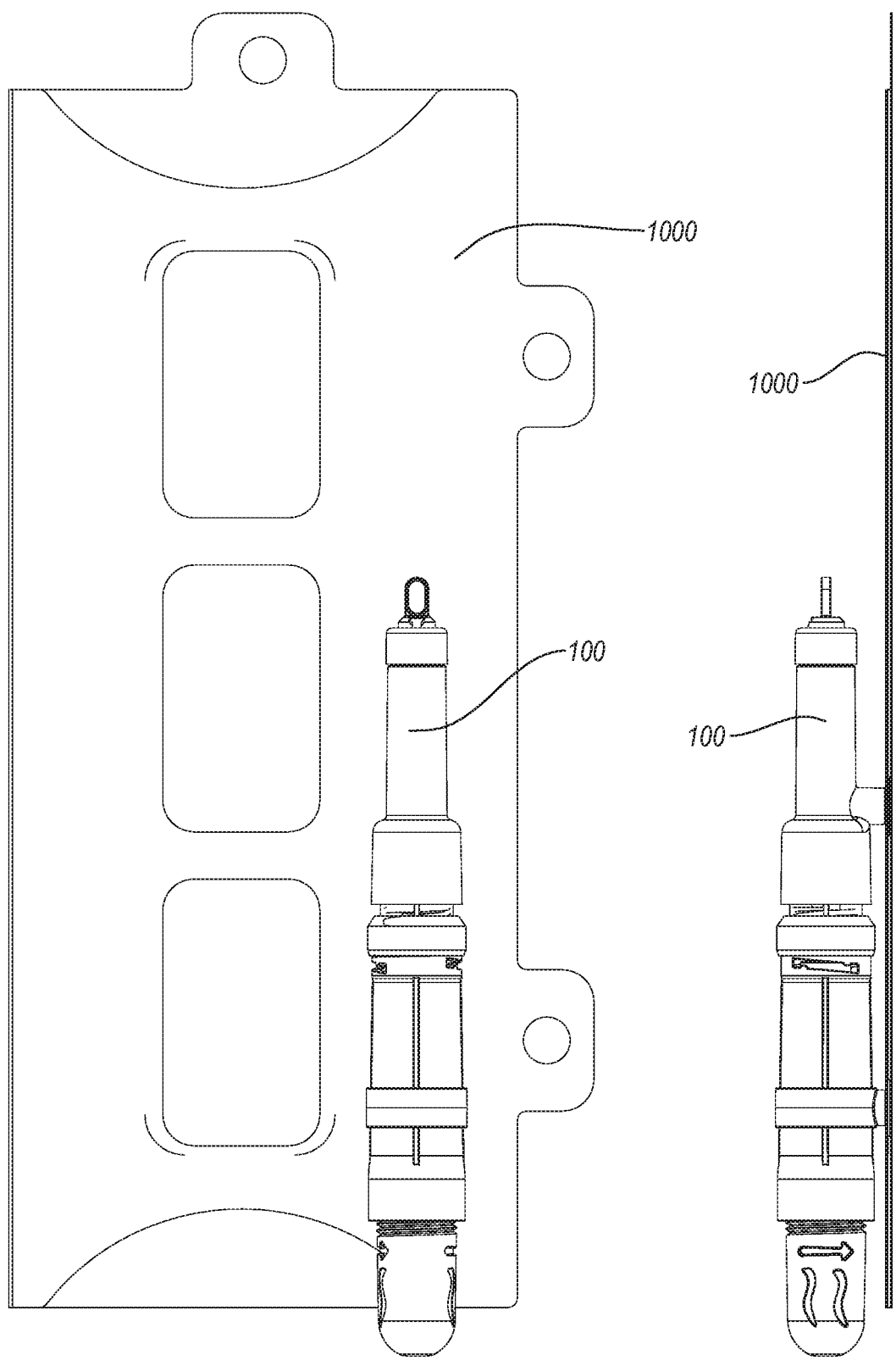
FIG. 10A is a top view of a pressure-regulating device connected to a pressure cuff according to an embodiment.
FIG. 10B is a side view of the pressure-regulating device connected to the pressure cuff of FIG. 10A.

As described above, the pressure-regulating device may be operably coupled to any number of suitable additional or alternative devices. FIGS. 10A-10B illustrate the pressure-regulating device 100 operably coupled to a pressure cuff pressure-regulating device 1000. Specifically, any pressure-regulating device described herein, such as the pressure-regulating device 100 may provide compressed gas at a suitable pressure to the pressure cuff pressure-regulating device 1000. In an embodiment, the pressure cuff pressure-regulating device 1000 may be used to compress one or more elements or devices with a specific or selected pressure (as controlled by the pressure-regulating device 100). For example, an IV bag of fluid or solution (e.g., for intravenous injection) may be placed inside the pressure cuff pressure-regulating device 1000, and the pressure cuff pressure-regulating device 1000 may compress the IV bag to produce a suitable flow of the fluid out of the IV bag and to a patient. Hence, for example, instead of a gravity-fed flow of the fluid out of the IV bag, which may require vertically suspending the IV bag, the flow out of the IV bag may be produced by the pressure applied thereon by the pressure-regulating device 1000, which may be controlled by the pressure-regulating device 100, as described above.

Figure 11:
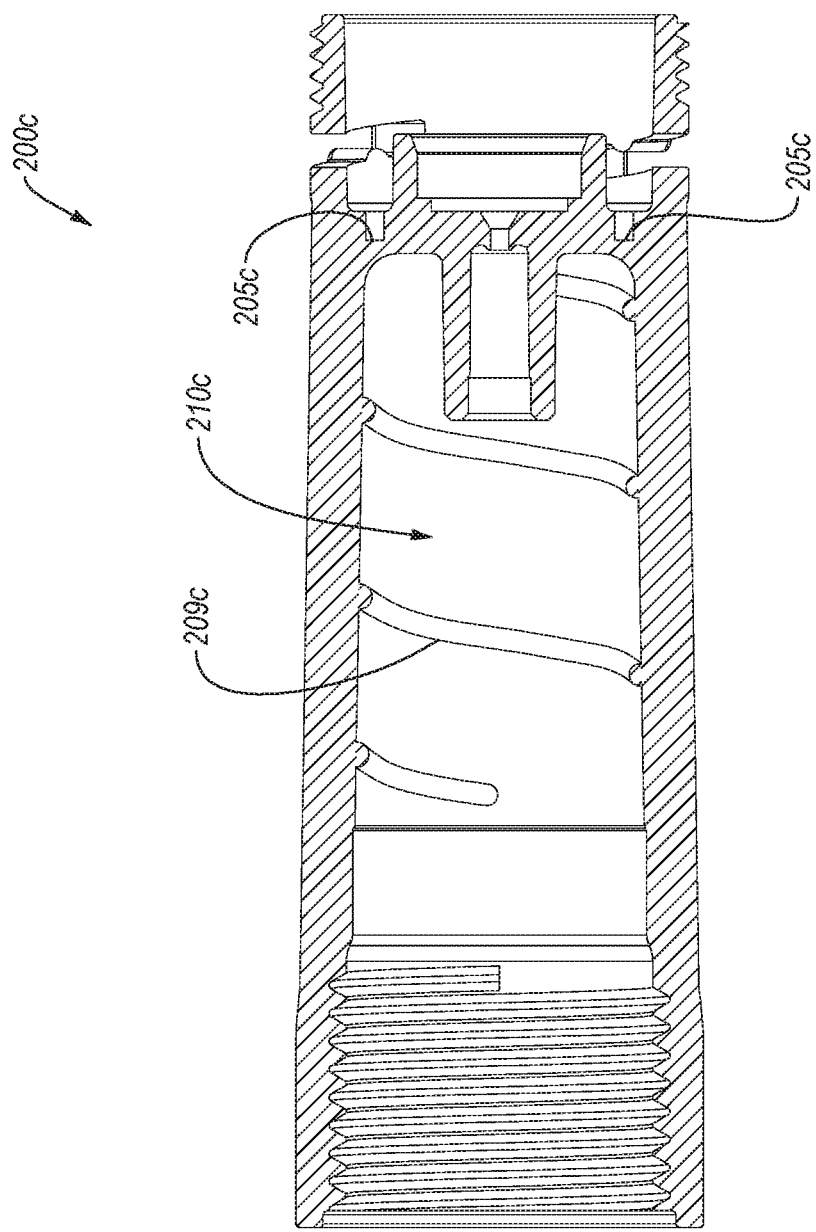
FIG. 11 is a cross-sectional view of an expansion body of a pressure-regulating device according to an embodiment.

As described above, the interior surface of expansion body, which defines the expansion chamber, may be generally smooth. Alternatively, the expansion body may have any number of suitable features on the internal surface thereof. FIG. 11 is a cross-sectional view of an expansion body 200c according to an embodiment. Except as otherwise described herein, elements and features of the expansion body 200c may be similar to or the same as elements and features of the expansion body 200 (FIGS. 2A-2C).

The expansion body 200c may have an expansion chamber 210c defined by a wall 206c. For example, the wall 206c may have an inner surface that includes means for increasing thermal equilibrium within fluid of the chamber as the gas flows in the expansion chamber 210c. The means may include a groove or rib 209c disposed on the inner surface of the wall 206c.

The expansion chamber 210c may further include one or more safety features, such as one or more blow-out ports 205c. The blow-out ports 205c are in an orientation to relieve expansion chamber pressure to an intermediate cavity that is open to atmospheric pressure while obstructing the direct path of the relieved pressure stream for human protection in the event of an over pressurization of the expansion chamber.

Generally, the blow-out ports 205c may be configured to rupture at a selected pressure, to prevent uncontrolled failure of the wall 206c of the expansion body 200c. In an embodiment, the blow-out ports 205c may include one or more stress-concentration or crack-initiation points (e.g., sharp corners), at which the blow-out ports 205c may start fail (e.g., such that the failure of the blow-out ports 205c initiates at selected locations or portions thereof.

The spiral rib 209c may increase the contact time of fluid with the inner surface of the wall 206c and may increase heat transfer with the gas flowing in the expansion chamber 210c. While the device illustrated in FIG. 11 includes a spiral rib 209c, any suitable or similar structure may be disposed on or at least partially define the inner surface of the wall 206c.

Figure 12A:
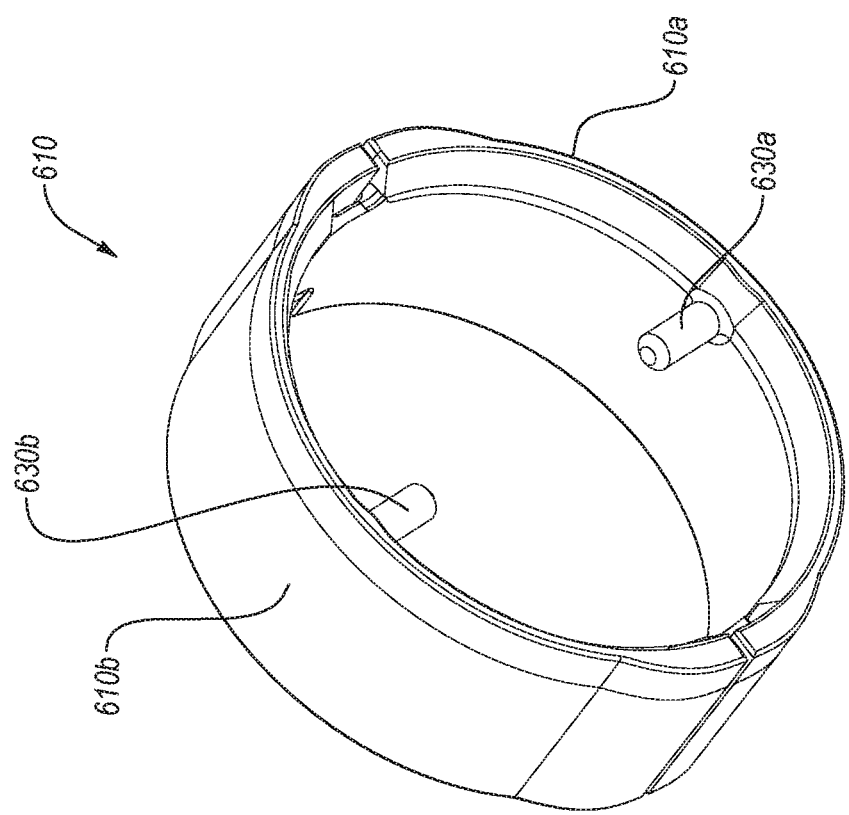
FIG. 12A is a perspective view of an outer ring of a lock mechanism according to an embodiment.
Figure 12B:
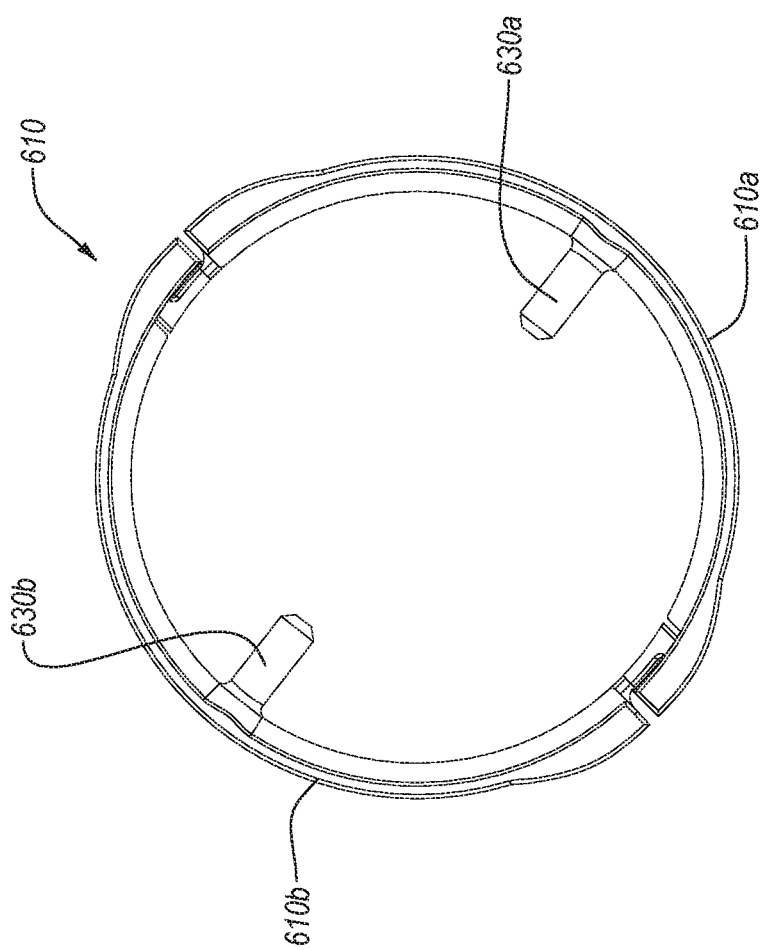
FIG. 12B is a top view of the outer ring of FIG. 12A.
Figure 12C:
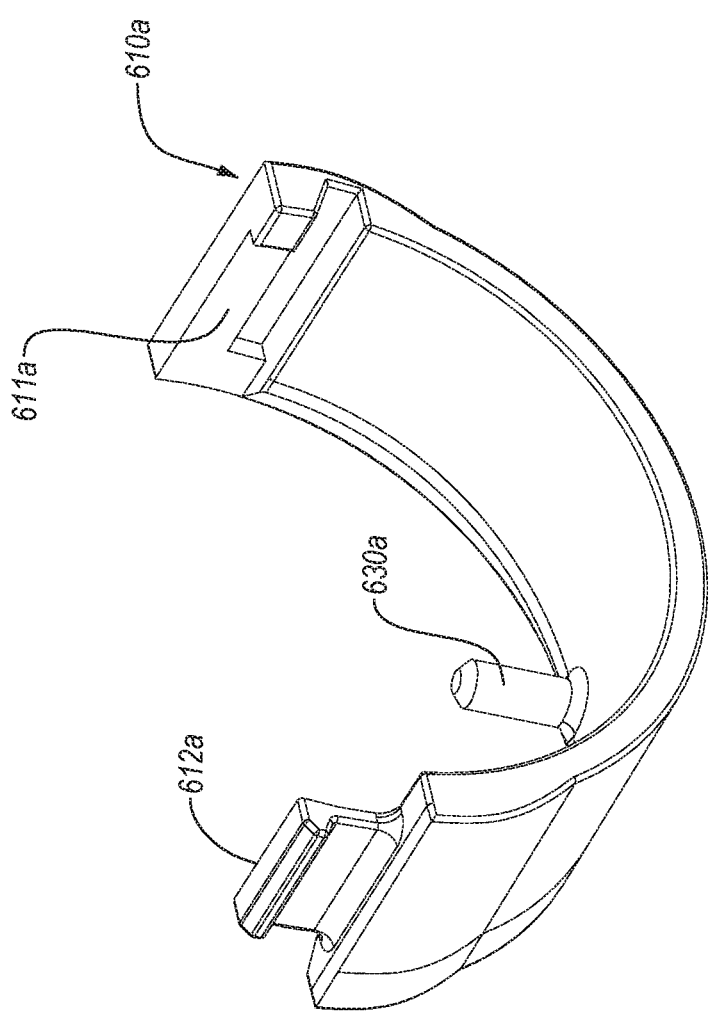
FIG. 12C is a perspective view of one half of the outer ring of FIG. 12A.
Figure 12D:
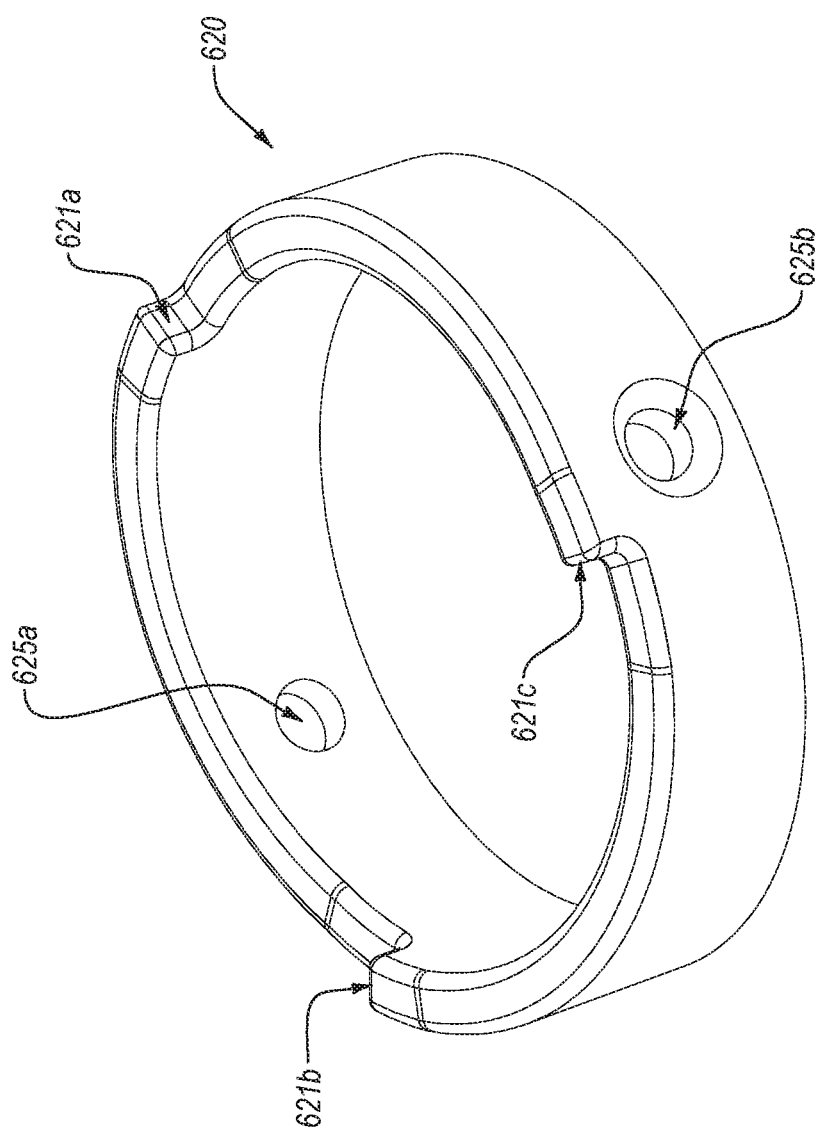
FIG. 12D is a perspective view of an inner ring of a lock mechanism according to an embodiment.
Figure 12E:
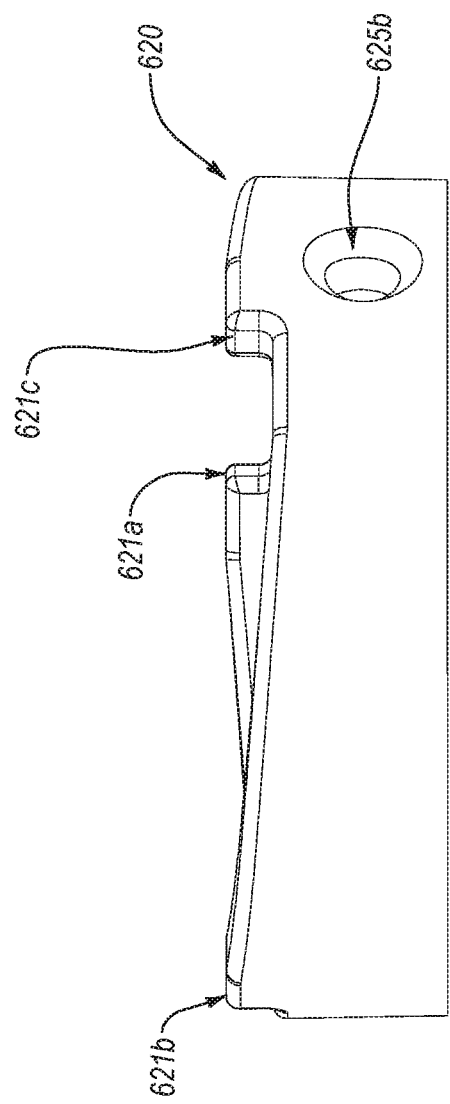
FIG. 12E is a side view of the inner ring of FIG. 12D.

As described above, the pressure-regulating device may include a lock mechanism that has inner and outer rings. FIGS. 12A-12C illustrate outer ring 610, and FIGS. 12D-12E illustrate inner ring 620 according to an embodiment.

As described above, the lock mechanism may include the outer ring 610, the inner ring 620, and the connection posts 630a, 630b connecting together the outer ring 610 and inner ring 620. As shown in FIGS. 12D-12E, the inner ring 620 may include openings 625a, 625b that correspond to the connection posts 630a, 630b. For example, the connection posts 630a, 630b may be integrated with the outer ring 610 and may align with and may be sized and shaped to fit into the corresponding ones of the openings 625a, 625b. After positioning the inner ring 620 at the suitable position in the pressure-regulating device, the outer ring 610 may be positioned over the inner ring 620 (as described above), and the connection posts 630a, 630b may enter the openings 625a, 625b, thereby securing together the outer ring 610 and inner ring 620.

In an embodiment, the outer ring 610 may include two portions, first portion 610a and a second portion 610b, as shown in FIGS. 12A-12C. For example, the first and second portions 610a, 610b may snap together (e.g., to facilitate assembly of the lock mechanism). As shown in FIG. 12C, the first portion 610a may include a catch 611a and a snap-hook outer ring 612a. The second portion 610b may have complementary snap-hook that snaps over the catch 611a and a complementary catch that receives the snap-hook 612a of the first portion outer ring 610a. For example, the connection posts 630a, 630b may be aligned with and/or inserted into the corresponding openings 625a, 625b, and thereafter the first and second portions 610a, 610b may be snapped and secured together. It should be also appreciated that the first and second portions 610a, 610b may be connected together with any number of suitable connection mechanisms.

In an embodiment, the inner ring 620 may include two or more peaks, such as peaks 621a-621c at an edge thereof. The peaks 621a-621c may engauge the first stage regulator piston (as described above). For example, recessing edge portions adjacent to the peaks 621a-621c (e.g., such as to form or define the peaks 621a-621c) may provide a reduce area of contact with the piston (as compared with a continuous edge without recesses, which may reduce frictional forces between the inner ring 620 and the piston, thereby facilitating ease of rotating the outer ring 610 relative to the piston.

Figure 13:
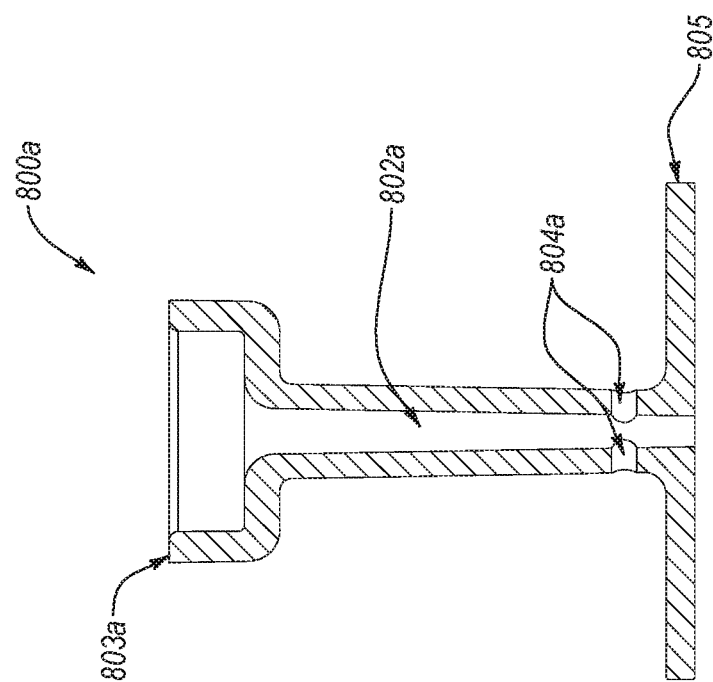
FIG. 13 is a cross-sectional view of a regulator-inflow member of a pressure-regulating device according to an embodiment.

As described above, a regulator-inflow member may be mounted upstream from the first valve. FIG. 13 is a cross-sectional view of a regulator-inflow member 800a according to an embodiment. Except as otherwise described herein, elements and features of the regulator-inflow member 800a may be similar to or the same as elements and features of the regulator-inflow member 800 (FIG. 5). For example, the regulator-inflow member 800a may include a socket 803a that may be similar to the socket 803 (FIG. 5).

In the illustrated embodiment, the regulator-inflow member 800a includes a passageway 802a that is capped at the proximal end thereof (e.g., upstream end). Moreover, the regulator-inflow member 800a may include side ports 804a extending through the wall of the regulator-inflow member 800a to the passageway 802a, such that gas may flow through the side ports 804a and into the passageway 802a. Generally, the side ports 804a and/or the passageway 802a may have any number of suitable shapes and/or sizes, which may vary from one embodiment to the next.

Furthermore, the regulator-inflow member 800a may include a front baffle 805a. Generally, the baffle 805a may have any number of suitable shapes and sizes. In an embodiment, the baffle 805a may be generally disk-shaped. In additional or alternative embodiments, the baffle 805a may be square, oval, etc.

Figure 14:
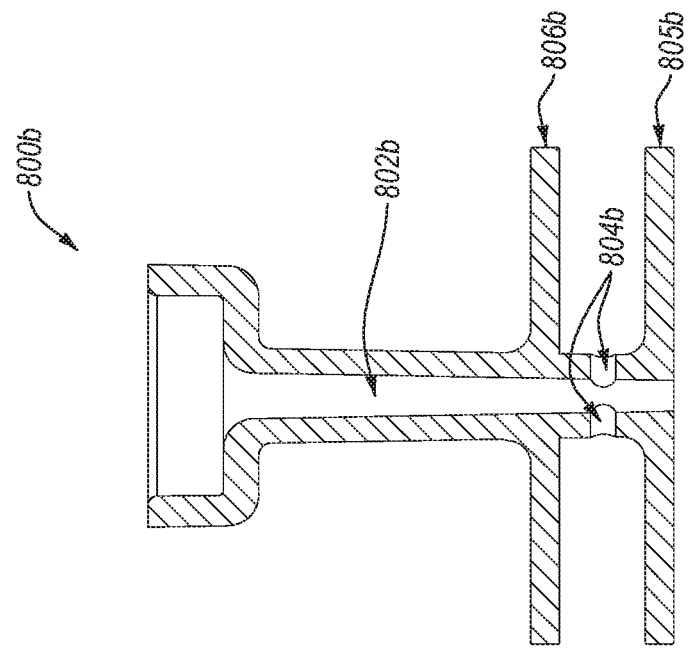
FIG. 14 is a cross-sectional view of a regulator-inflow member of a pressure-regulating device according to another embodiment.

In the illustrated embodiment, the baffle 805a is positioned proximally or upstream from the side ports 804a. In some embodiments, the regulator-inflow member may have multiple baffles. FIG. 14 is a cross-sectional view of a regulator-inflow member 800b according to an embodiment. Except as otherwise described herein, elements and features of the regulator-inflow member 800b may be similar to or the same as elements and features of the regulator-inflow member 800a (FIG. 13). For example, the regulator-inflow member 800b may include a passageway 802b, side ports 804b in fluid communication with the passageway 802b, and may further include a front baffle 805b. In the illustrated embodiment, the regulator-inflow member 800b includes a back or secondary baffle 806b that may be positioned downstream or in the distal direction from the baffle 805b. In some embodiments, the baffles 805b and 806b may be positioned such that the side ports 804b are located therebetween (e.g., the centers of the side ports 804b may be equidistantly spaced from opposing surfaces of the baffles 805b, 806b).

Figure 15:
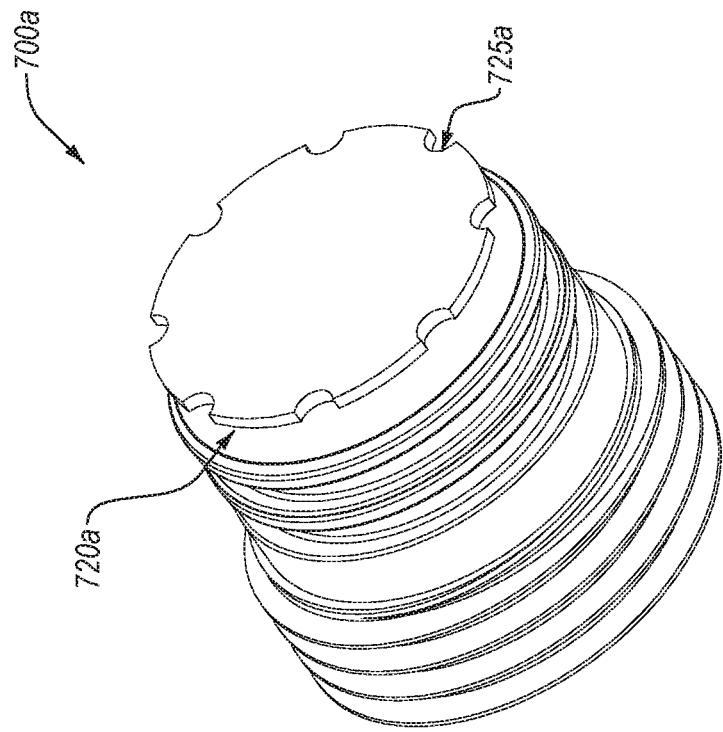
FIG. 15 is a perspective view of an inlet deflector of a pressure-regulating device according to an embodiment.

As described above, the inlet deflector may have any number of suitable shapes and/or configurations. FIG. 15 is a perspective view of an inlet deflector 700a according to an embodiment. Except as otherwise described herein, elements and features of the inlet deflector 700a may be similar to or the same as the elements and features of the inlet deflector 700 (FIG. 5). For example, the inlet deflector 700a includes a baffle 720a (similar to the baffle 720 of the inlet deflector 700 (FIG. 5).

In the illustrated embodiment, the baffle 720 includes cutouts 725a. Generally, the cutouts 725a may have any number of suitable shapes and/or sizes. Moreover, the baffle 720a may have any number of cutouts 725a thereon. For example, increasing the size and/or the number of cutouts 725a may decrease the gas flow velocity relative to the baffle 720a.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A pressure-regulating device comprising:
a gas inlet;
an expansion body defining an expansion chamber that is in fluid communication with the gas inlet, the expansion body comprising a hollow protrusion extending, from a distal wall of the expansion body, upstream into the expansion chamber;
at least one pressure regulation stage in fluid communication with the expansion chamber and configured to decrease gas pressure of a gas passing through the at least one pressure regulation stage, wherein the at least one pressure regulation stage includes a valve, wherein an upstream opening of the hollow protrusion located within an interior of the expansion chamber communicates gas from the interior of the expansion chamber to the valve; and
a gas outlet positioned downstream from and in fluid communication with the at least one pressure regulation stage, and wherein the at least one pressure regulation stage comprises a first pressure regulation stage, wherein the valve is a first valve, which is part of the first pressure regulation stage, the first pressure regulation stage further comprising a first piston configured to actuate the first valve between an open position and a closed position and a first biasing member biasing the first piston toward an open position of the first valve, wherein the first piston and the first biasing member are secured between a distal end of the expansion body and a proximal end of an intermediate regulator body, and wherein the expansion body and the intermediate regulator body are threadedly coupled such that changing a distance between the distal end of the expansion body and the proximal end of the intermediate regulator body changes an amount of pressure decrease produced by the first pressure regulation stage.

2. The pressure-regulating device of claim 1, wherein hollow protrusion defines a cavity, and wherein the first valve comprises a seal and a sealing member located in the cavity.

3. The pressure-regulating device of claim 2 wherein the seal and sealing member of the first valve are retained within the cavity at least in part by a retainer received in the proximal opening and having a through passage for communicating the gas through the retainer to the first valve.

4. The pressure-regulating device of claim 1 further comprising a second pressure regulation stage including a second valve arranged in series with the first valve such that gas flowing out of the first valve is communicated to an inlet of the second valve.

5. The pressure-regulating device of claim 4, wherein the first valve and the second valve are substantially coaxially arranged, with a gas flow path through the pressure-regulating device extending substile along a longitudinal direction of the pressure-regulating device.

6. The pressure-regulating device of claim 4, wherein the second pressure regulation stage comprising a second piston configured to actuate the second valve between an open position and a closed position, and a second basing member biasing the second piston toward an open position of the second valve.

7. The pressure-regulating device of claim 4, wherein the second piston and the second biasing element are secured between a distal end of the intermediate regulator body and a cap of the pressure-regulating device.

8. The pressure-regulating device of claim 1, further comprising an inflow member coupled to and extending proximally from the hollow protrusion, the inflow member comprising a passageway for communicating gas from the expansion chamber to the valve.

9. A pressure-regulating device, comprising:
- a gas inlet;
- an expansion body defining an expansion chamber that is in fluid communication with the gas inlet;
- at least one pressure regulation stage configured to decrease gas pressure of a gas flowing therethrough, the at least one pressure regulation stage being in fluid communication with the expansion chamber and comprising:
  - a valve including a sealing member configured to open and close gas flow through the valve;
  - a piston movable in upstream and downstream directions relative to the gas inlet and configured to move the sealing member in the manner that opens the valve;
  - a first biasing member positioned to apply a force onto the piston in the upstream direction; and
  - an adjustment mechanism including opposing first and second threaded walls, threadedly engaged together to enclose the biasing member therebetween, wherein the piston seals against an inner surface of a first protrusion extending distally from the expansion body and is offset radially inward from the first threaded wall, and wherein the piston further seals against an inner surface of a second protrusion opposite the first protrusion and offset radially inward from the second threaded wall; and
- a gas outlet positioned downstream from the at least one pressure regulation stage.

10. The pressure-regulating device of claim 9, wherein the first threaded wall extends distally from the expansion body.

11. The pressure-regulating device of claim 9, wherein the expansion body includes a hollow protrusion that extends into the expansion chamber and defines a passage for communicating the gas from the expansion chamber to the valve, and wherein the sealing member is located in the passage.

12. A pressure-regulating device comprising:
- an inlet body defining a gas inlet, the inlet body comprising a baffle downstream from the gas inlet;
- an expansion body defining an expansion chamber that is in fluid communication with the gas inlet, the expansion body comprising a hollow protrusion extending proximally into the expansion chamber;
- a first pressure regulation stage in fluid communication with the expansion chamber and configured to decrease gas pressure of a gas passing through the first pressure regulation stage, wherein the first pressure regulation stage includes a first valve, wherein a proximal opening of the hollow protrusion located within an interior of the expansion chamber communicates gas from the interior of the expansion chamber to the first valve, the first pressure regulation stage further comprising a first piston configured to actuate the first valve between an open position and a closed position and a first biasing member biasing the first piston toward an open position of the first valve;
- a second pressure regulation stage including a second valve arranged in series with the first valve such that gas flowing out of the first valve is communicated to an inlet of the second valve; and
- a gas outlet positioned downstream from and in fluid communication with the second valve of the second pressure regulation stage.

13. The pressure-regulating device of claim 12, wherein hollow protrusion defines a cavity, and wherein the first valve comprises a seal and a sealing member located in the cavity.

14. The pressure-regulating device of claim 12, wherein the first valve and the second valve are substantially coaxially arranged, with a gas flow path through the pressure-regulating device extending substile along a longitudinal direction of the pressure-regulating device.

15. The pressure-regulating device of claim 12, wherein the baffle extending radially outward from the gas inlet into a portion of the expansion chamber which is wider than the gas inlet.

* * * * *